E. HANAK.
CONVEYER SYSTEM.
APPLICATION FILED FEB. 25, 1918.
1,297,680.
Patented Mar. 18, 1919.
16 SHEETS—SHEET 6.
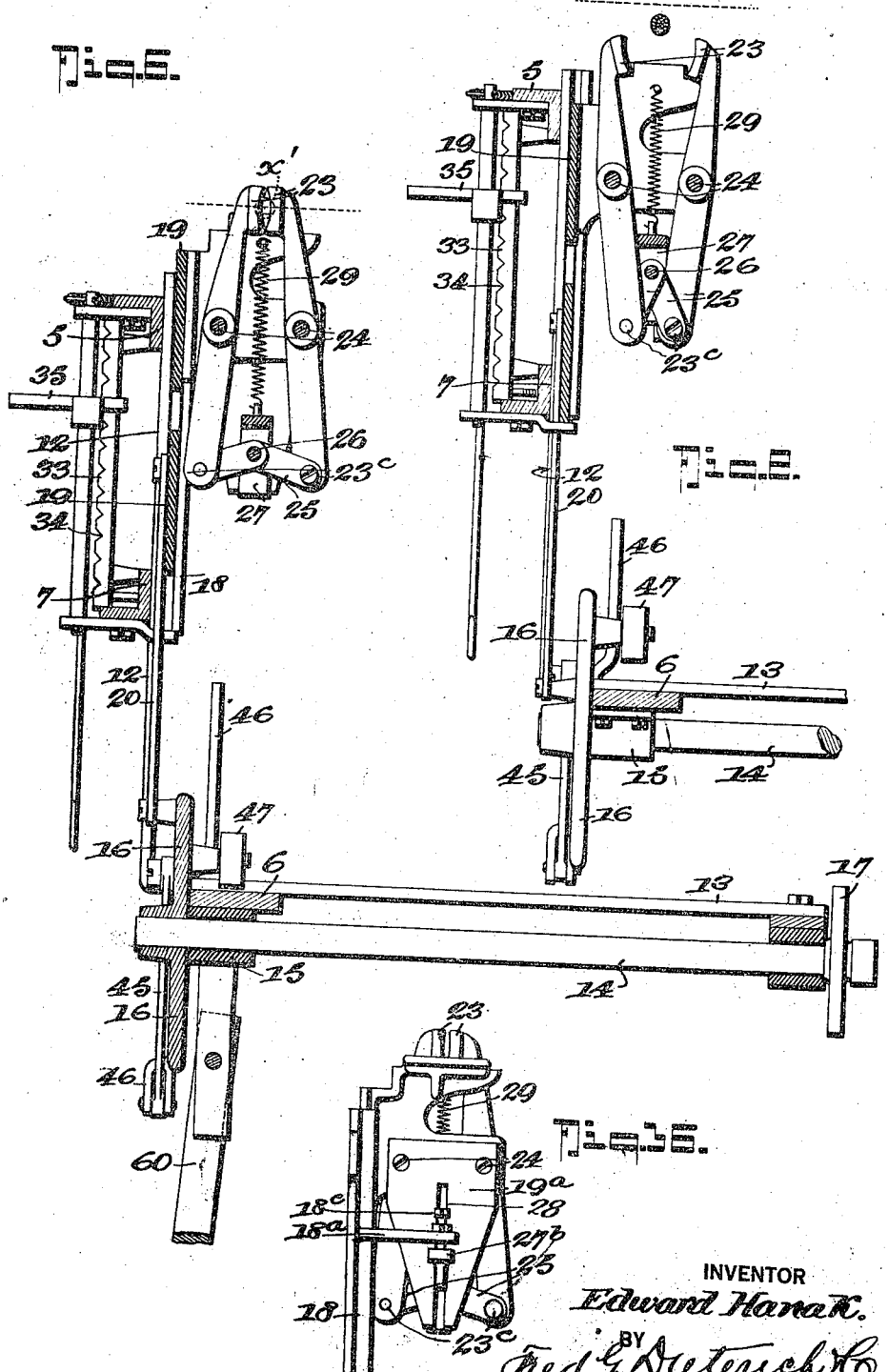
INVENTOR
Edward Hanak.
BY
Fred G. Dieterich & Co.
ATTORNEYS

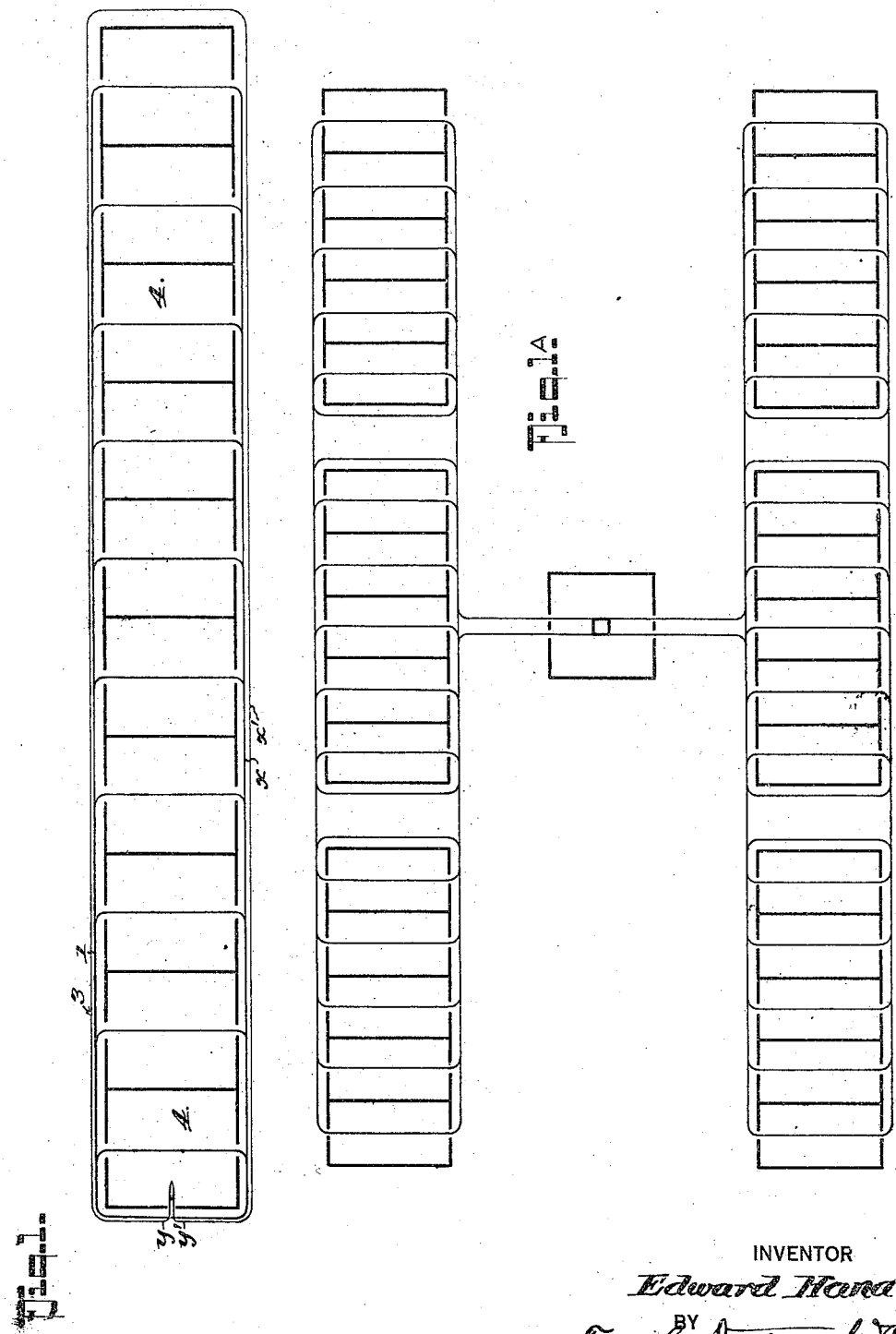

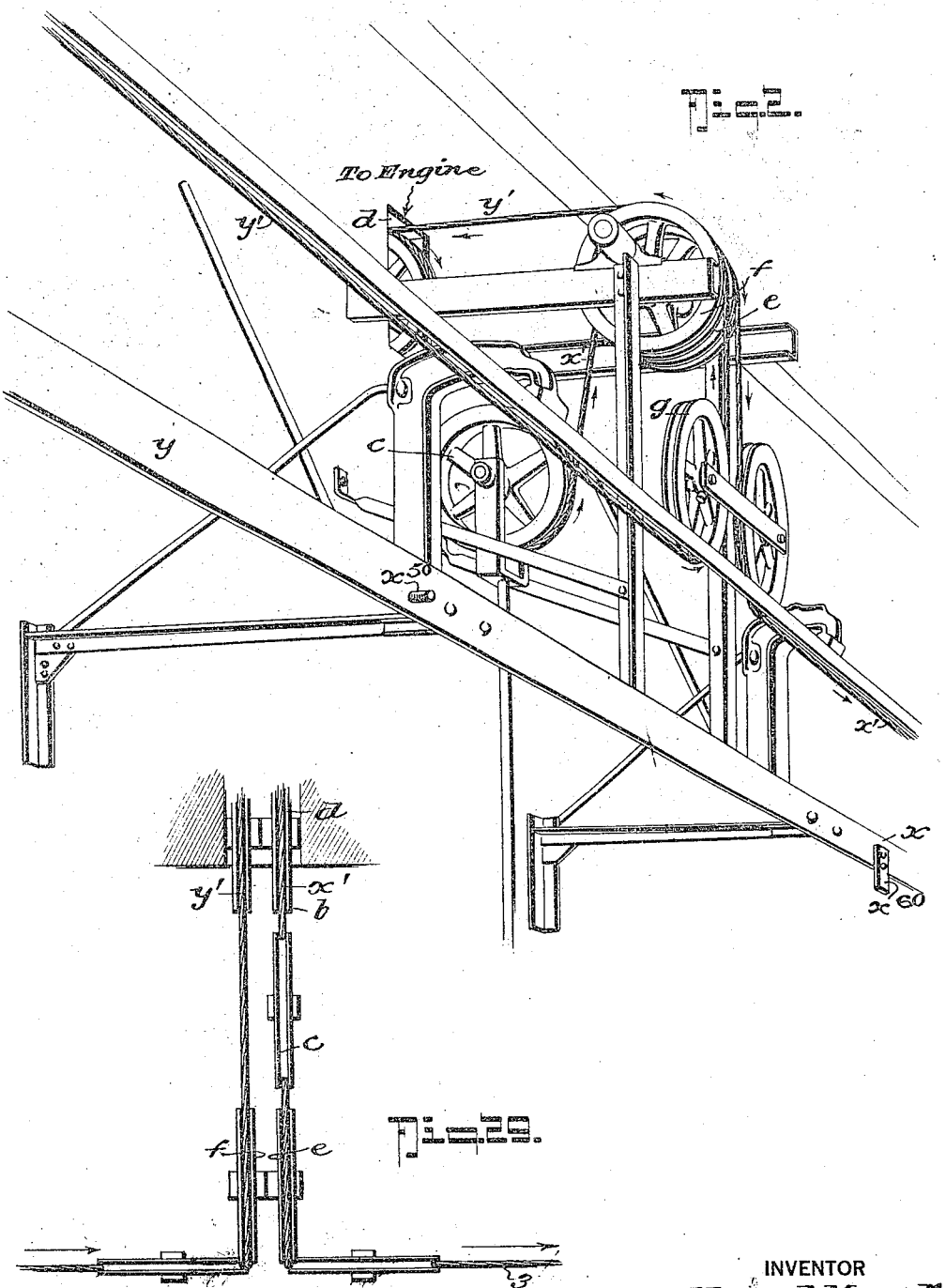

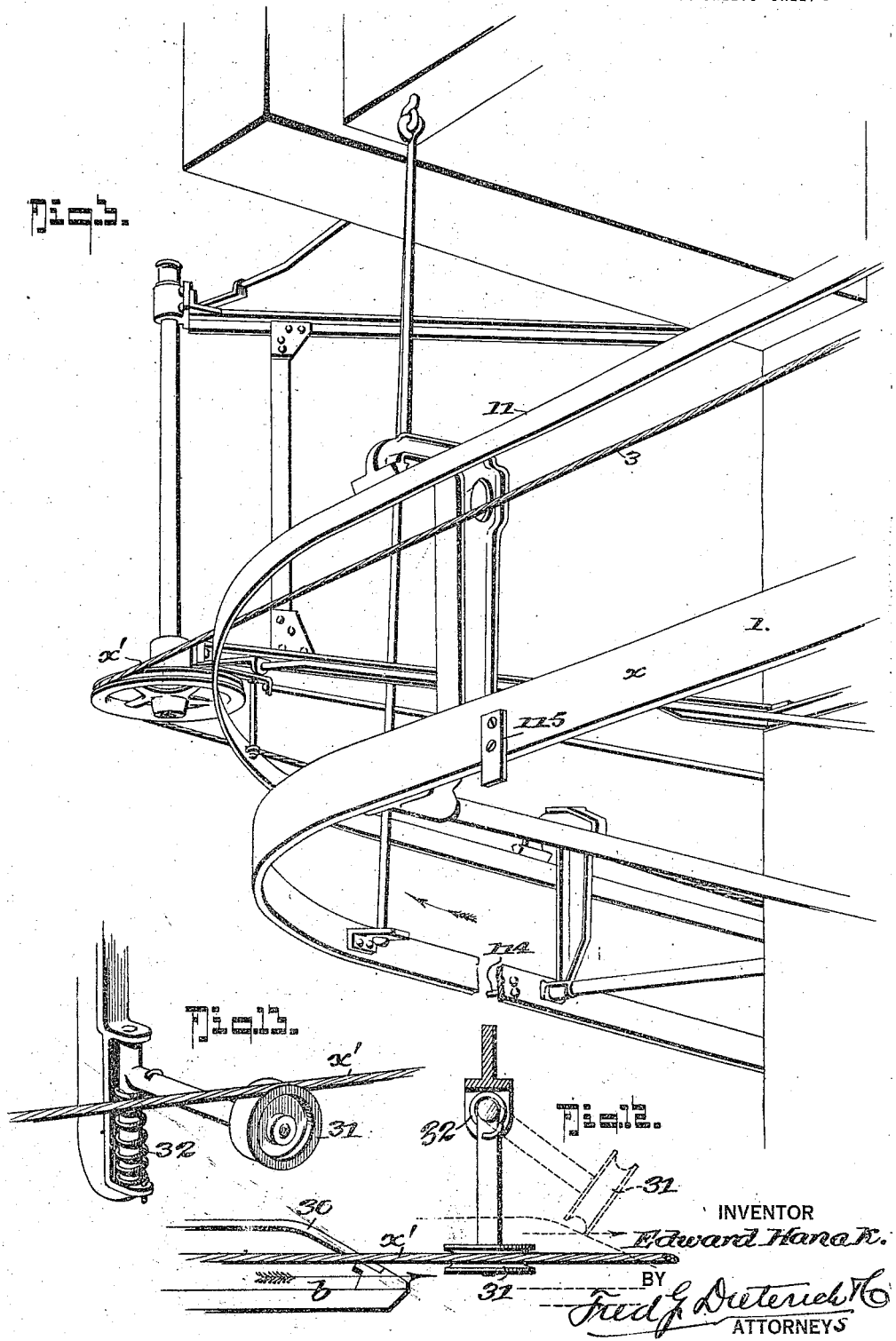

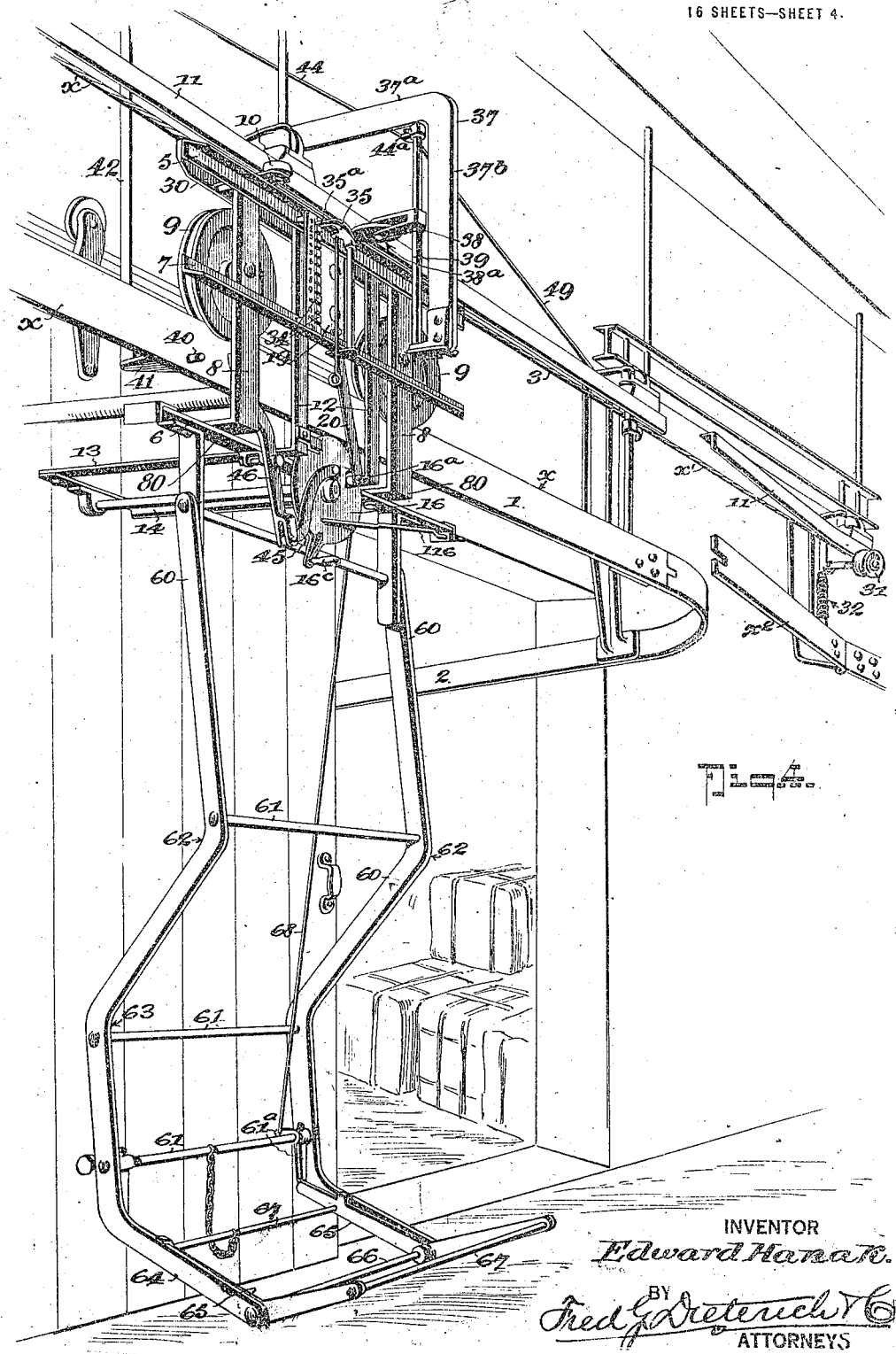

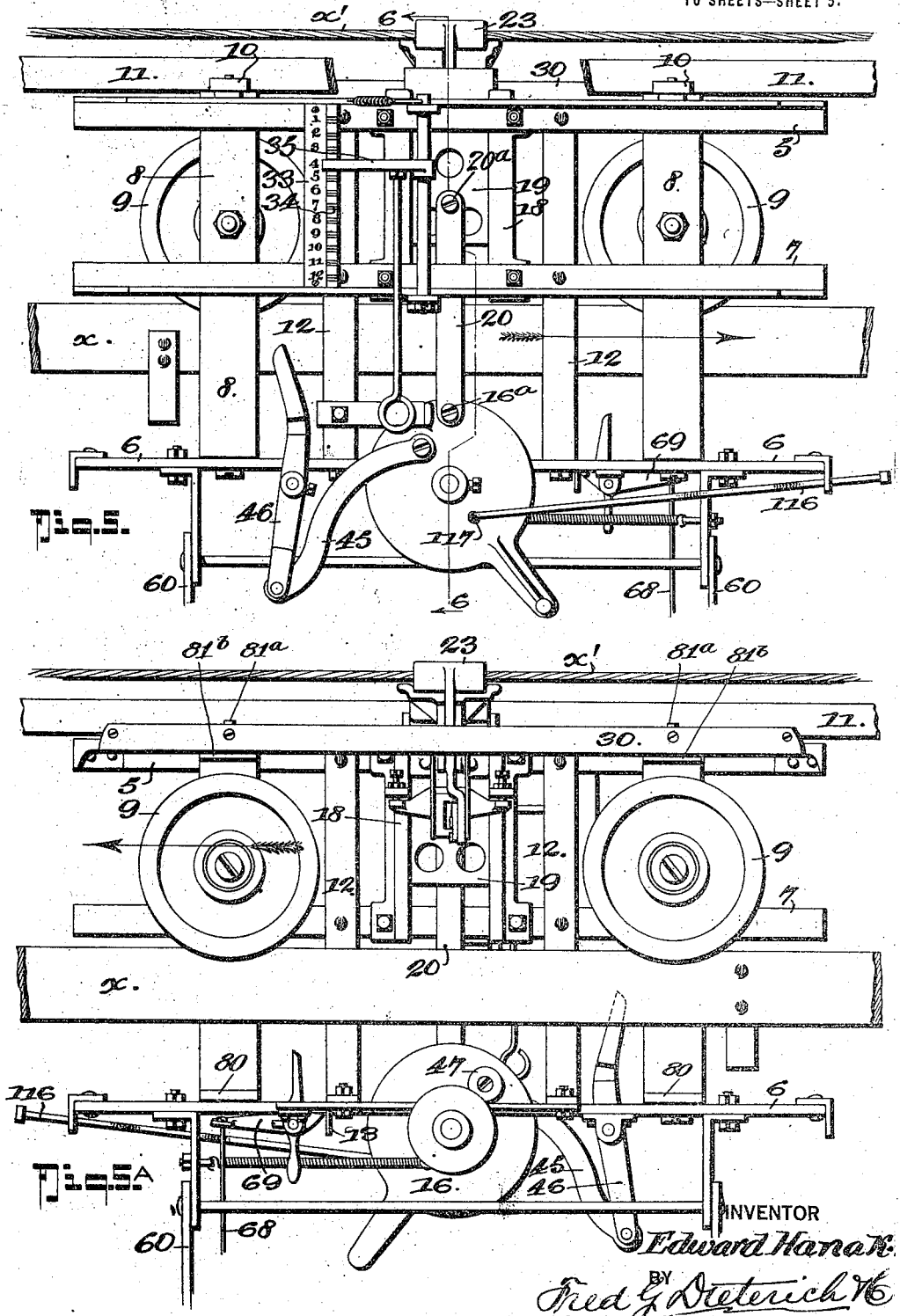

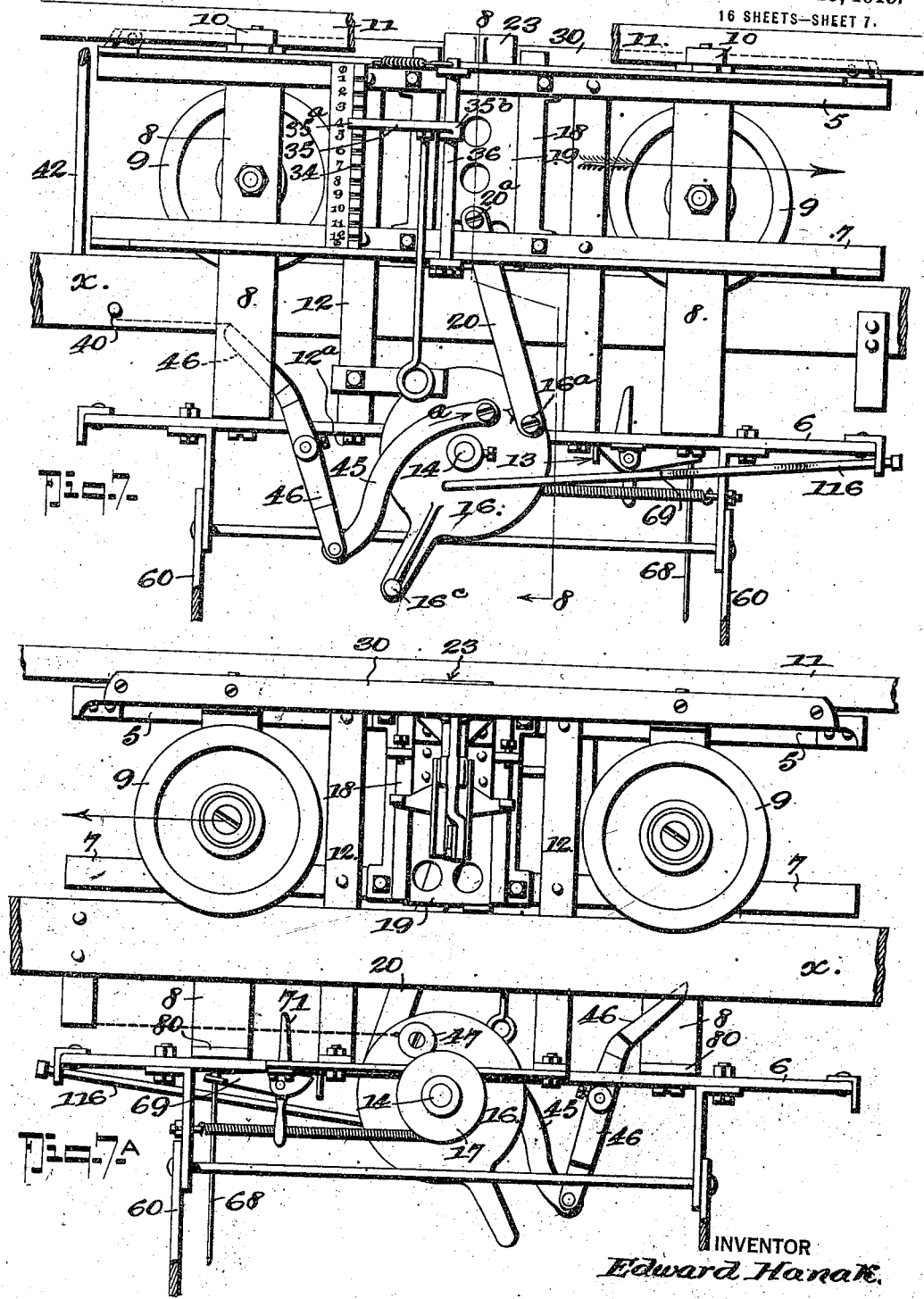

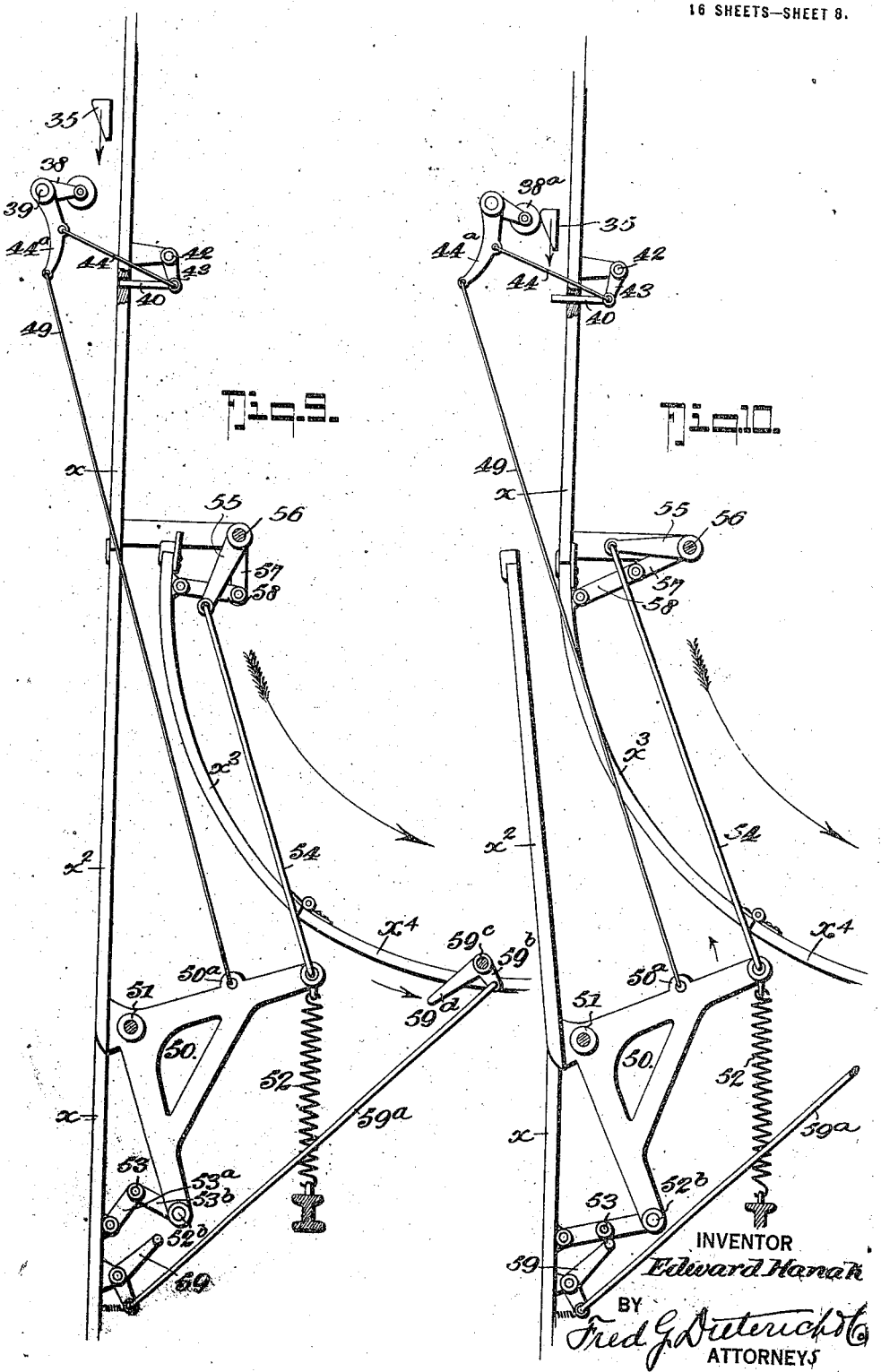

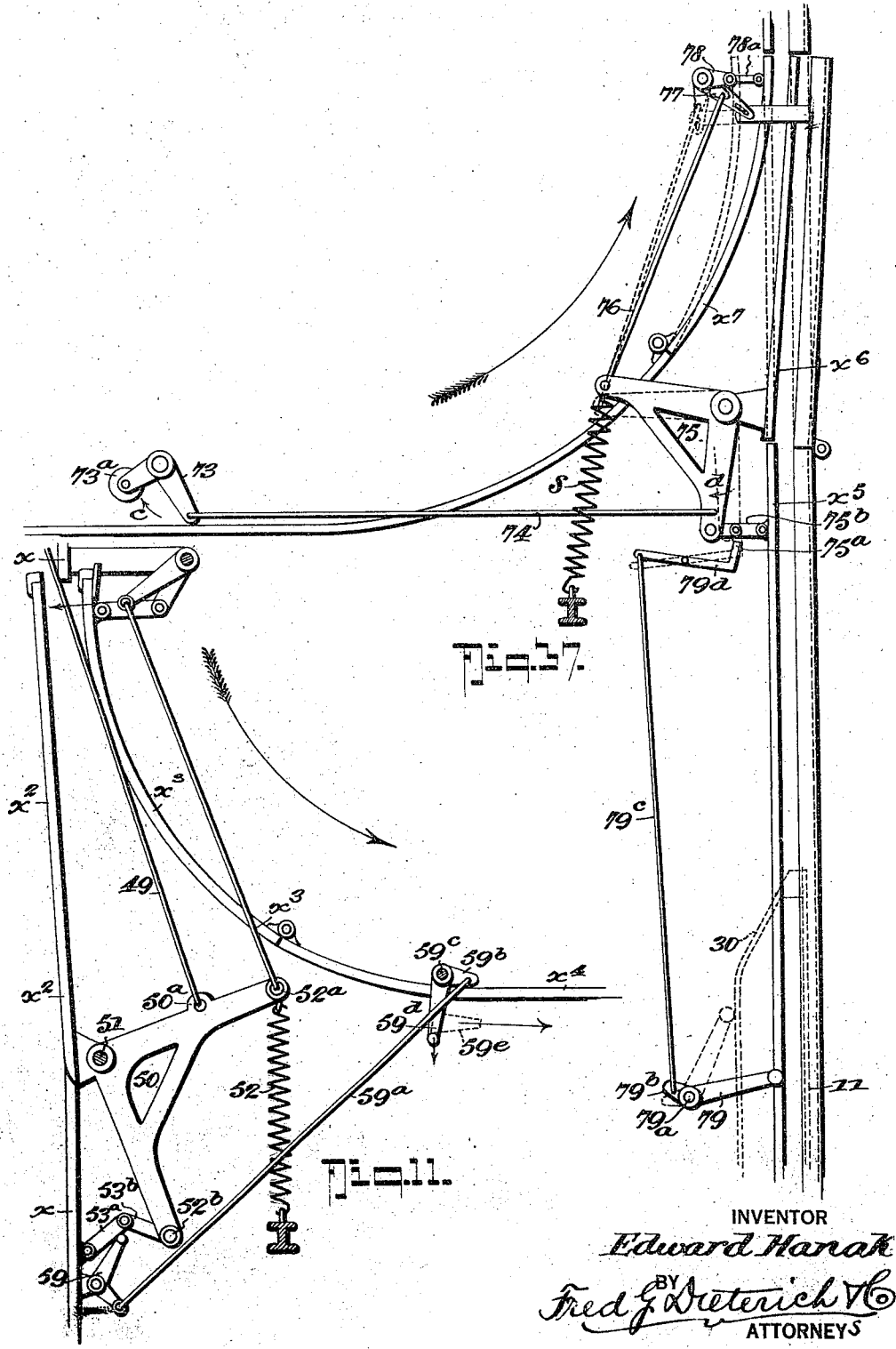

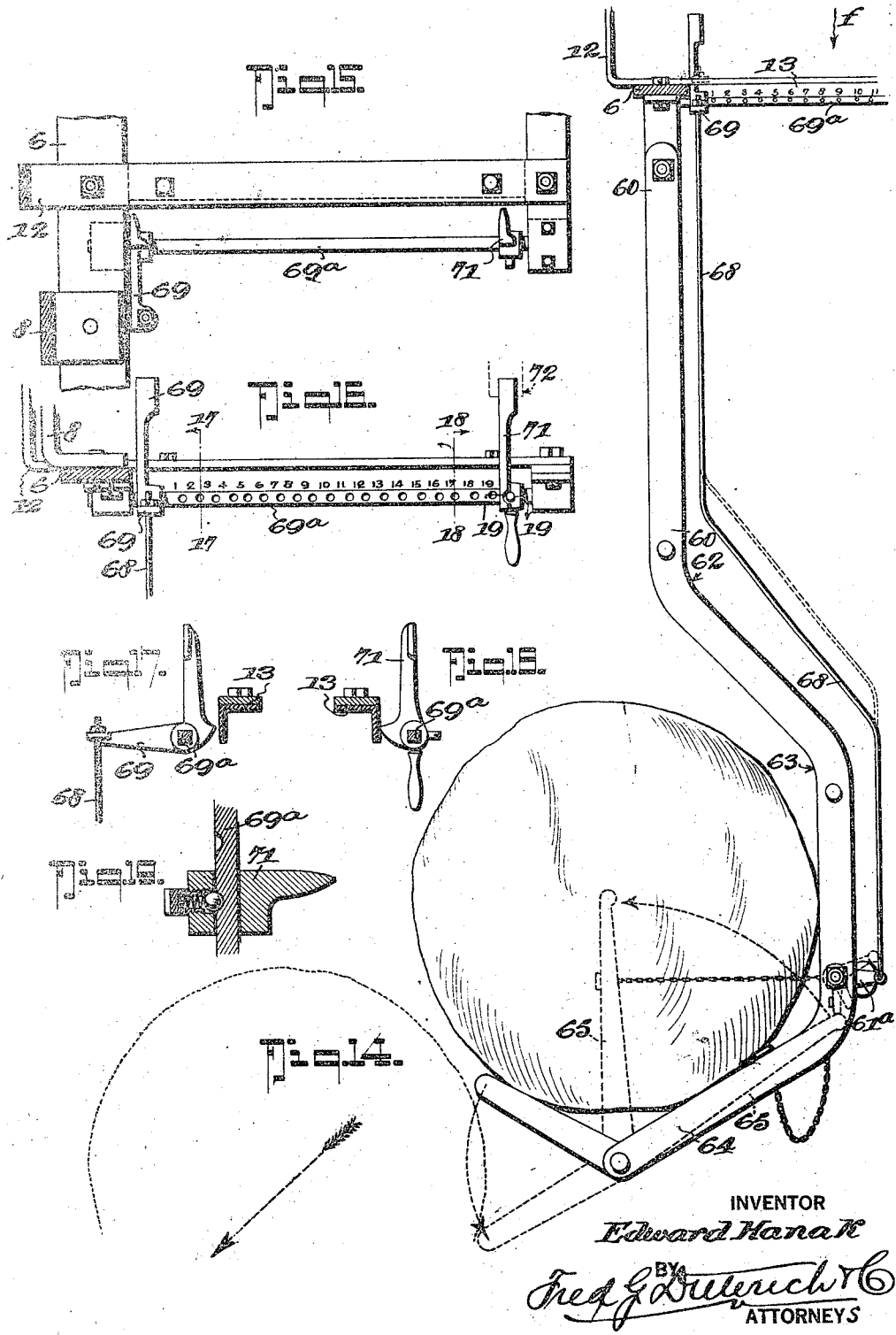

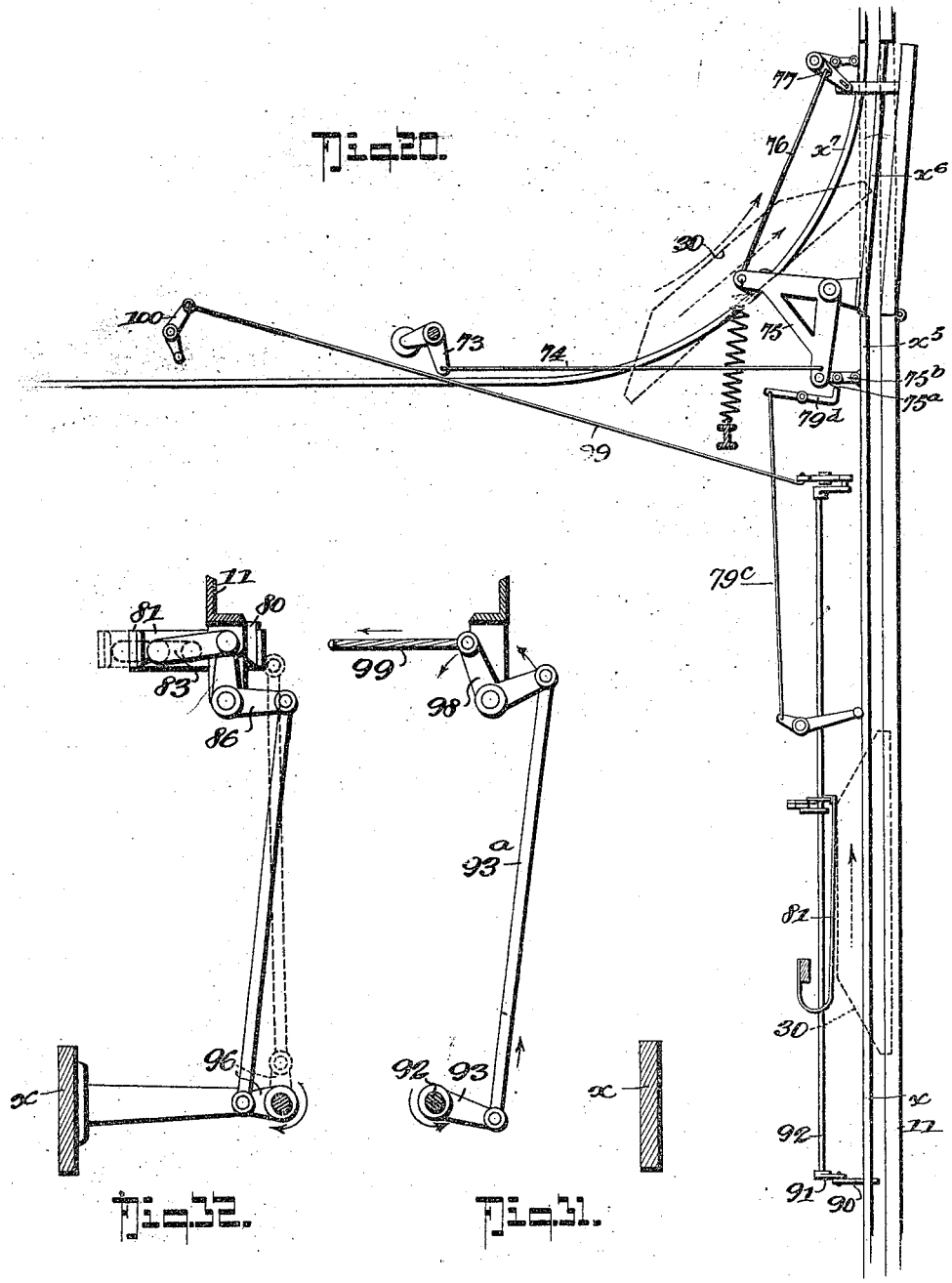

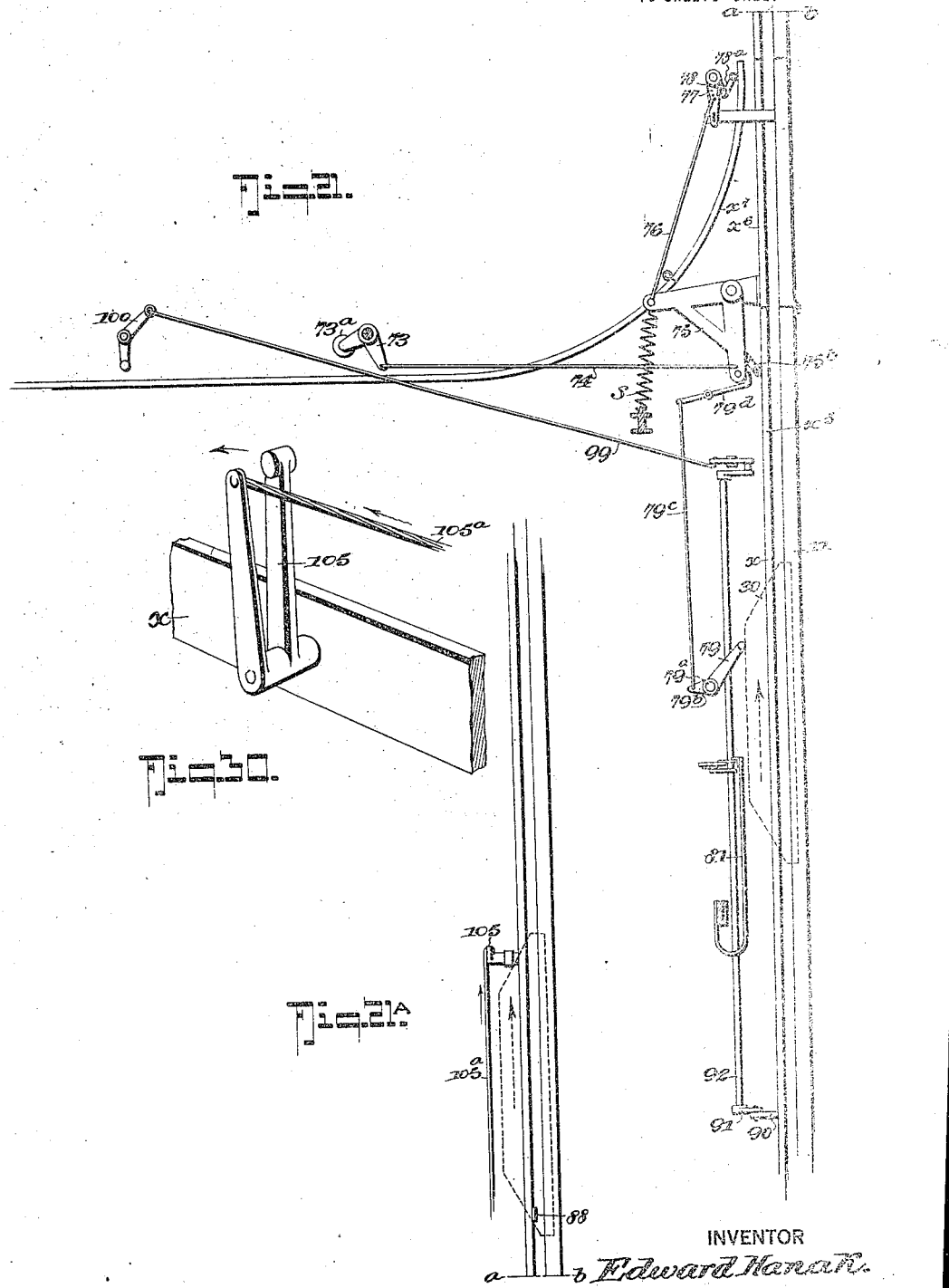

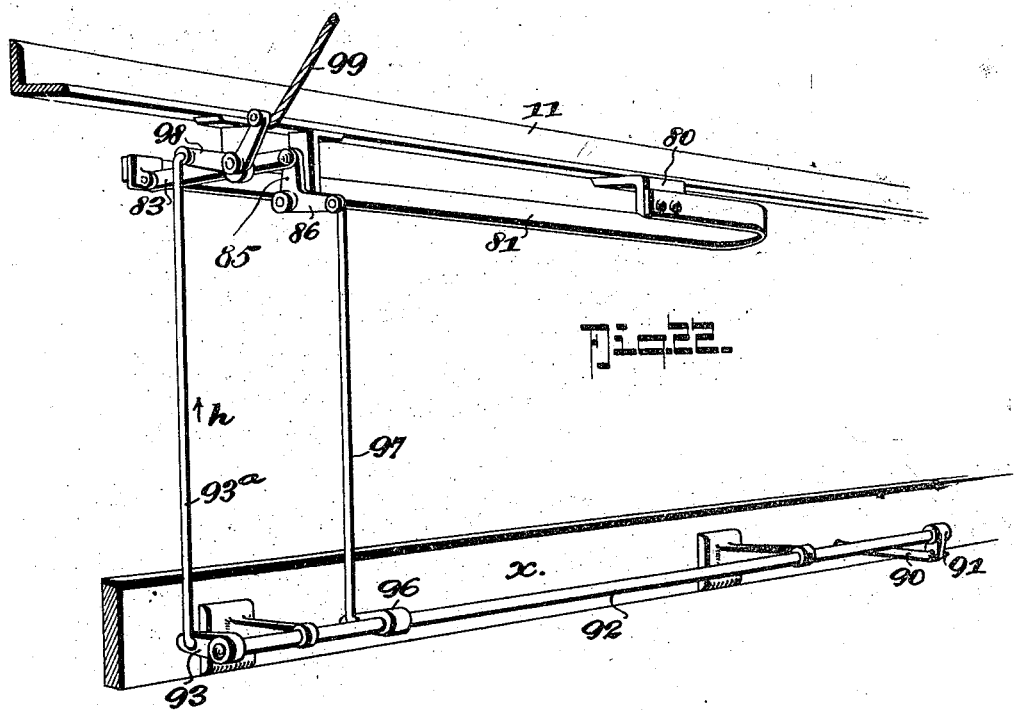

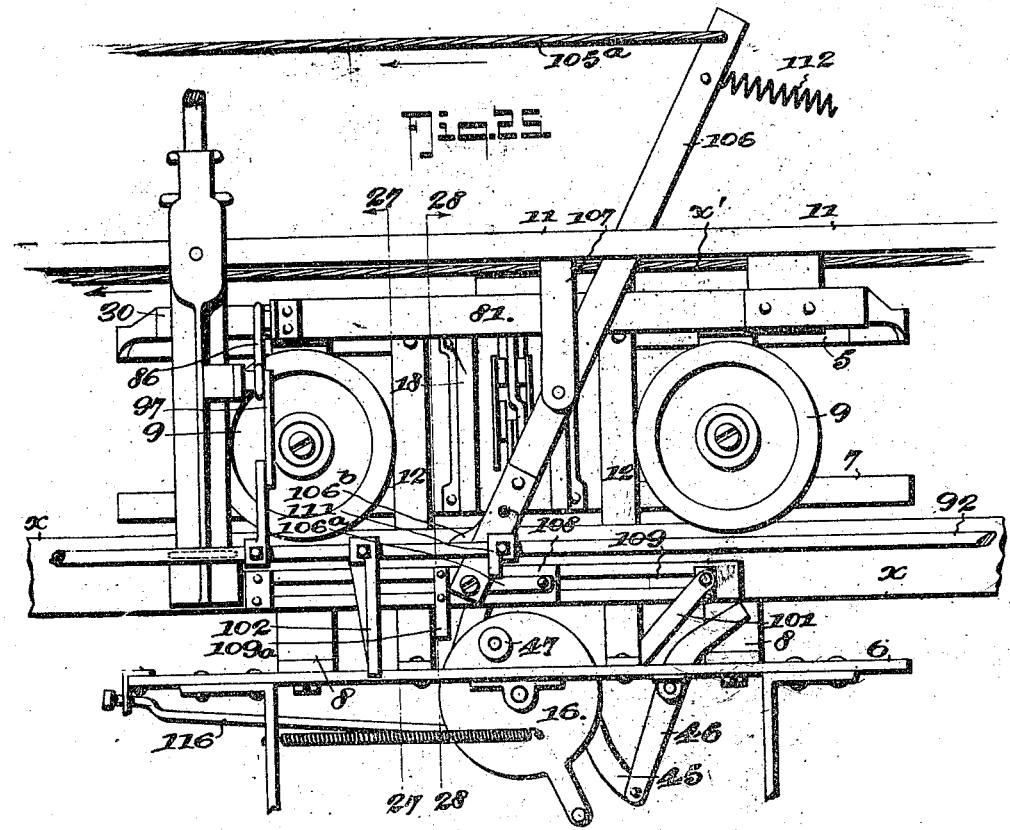

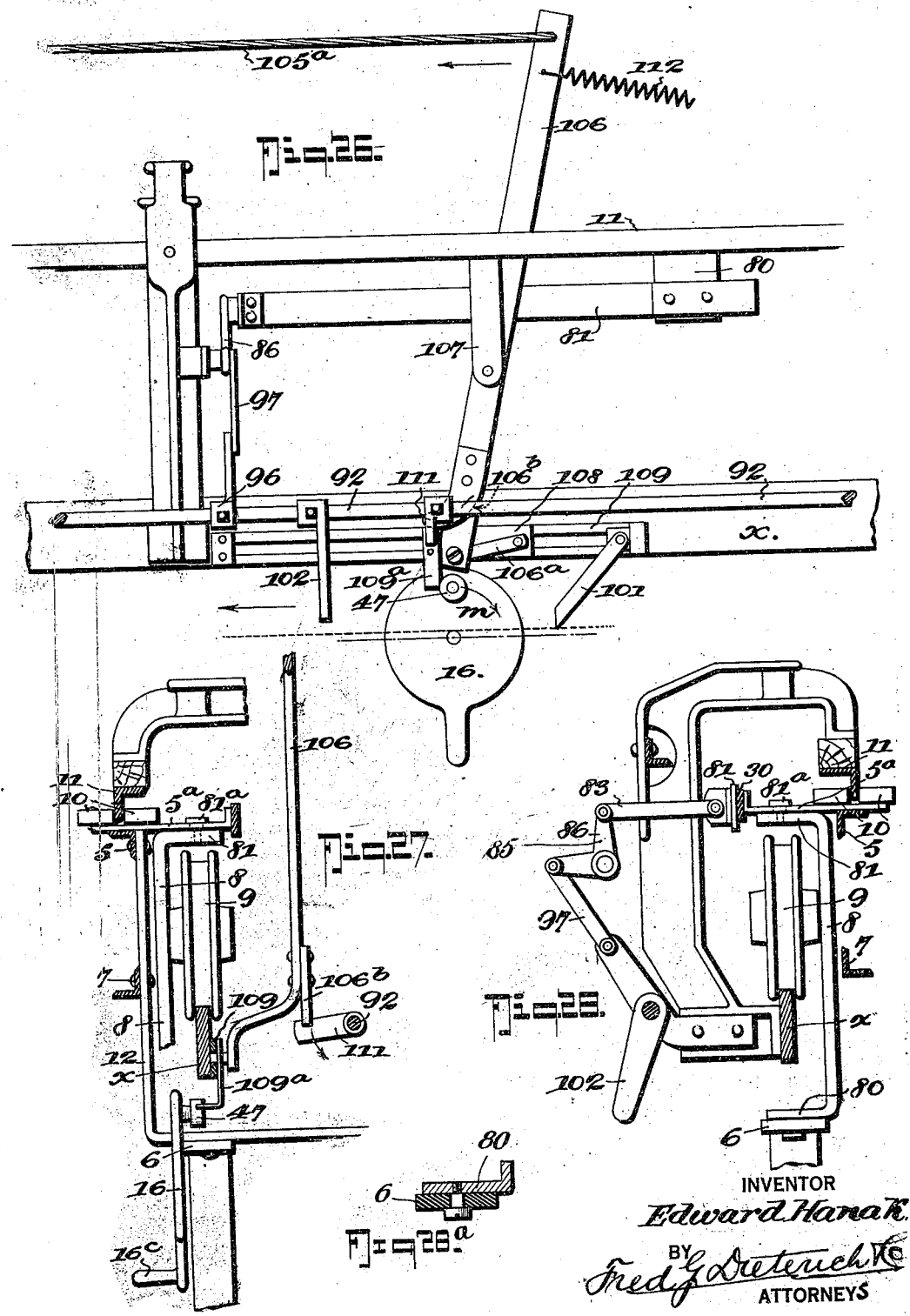

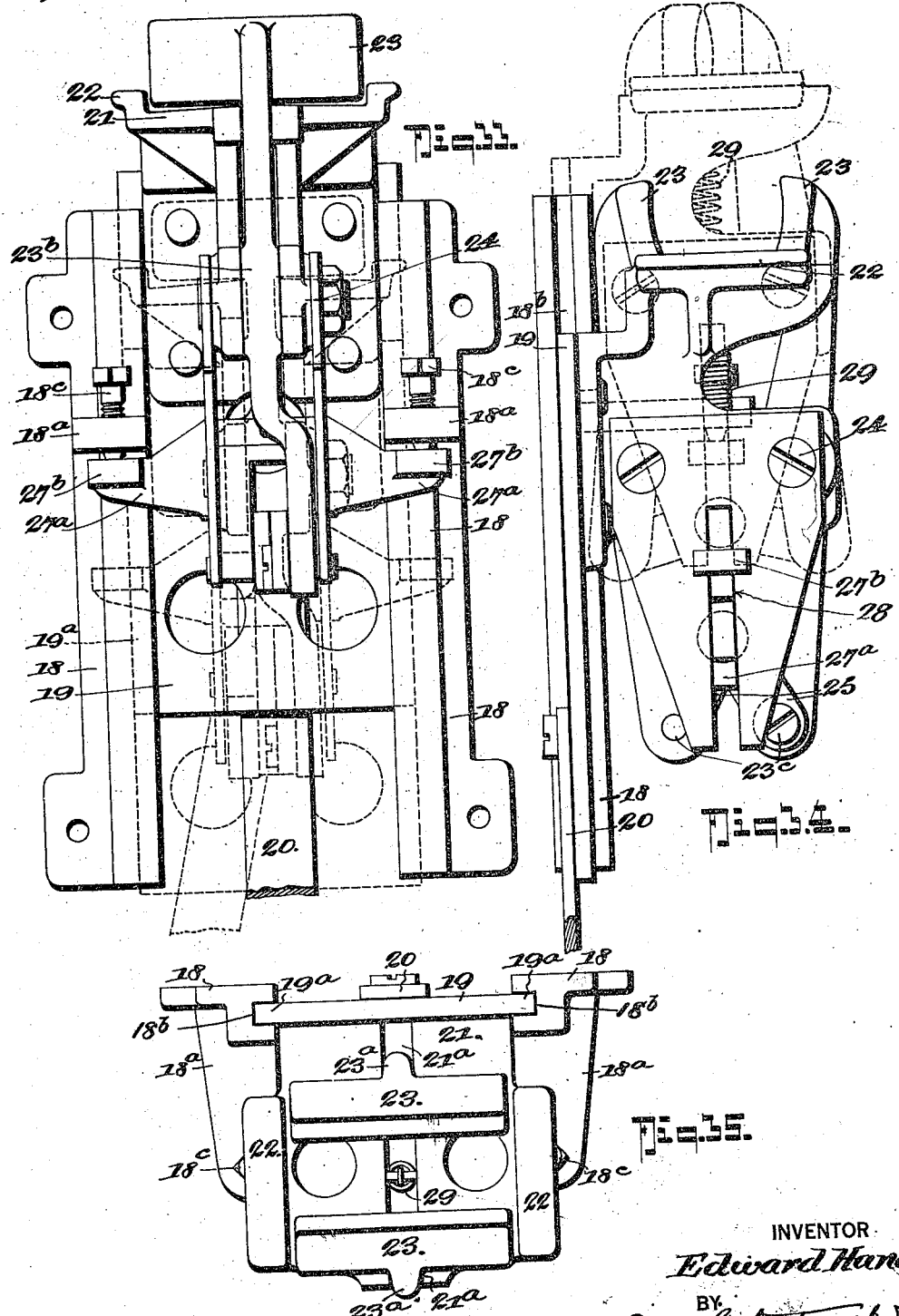

UNITED STATES PATENT OFFICE.

EDWARD HANAK, OF HOUSTON, TEXAS.

CONVEYER SYSTEM.

1,297,680.

Specification of Letters Patent. Patented Mar. 18, 1919.

Application filed February 25, 1918. Serial No. 219,092.

*To all whom it may concern:*

Be it known that I, EDWARD HANAK, a citizen of the United States, residing at Houston, in the county of Harris and State of Texas, have invented a new and Improved Conveyer System, of which the following is a specification.

My invention is an improved conveyer system that will take a package and automatically carry it to any selected point along the system, discharge the package and return to the starting point.

The main object of my invention is to provide a conveyer system or goods carrier of the general character stated, in the use of which much labor is saved, since a considerable less number of truckers is needed than is generally required, and the usual long back haul eliminated.

Generically, my invention is in the nature of a mono-rail trolley system in which, after the trolley or goods conveyer is started for conveying the load to a selected place of delivery, the operation of deflecting the trolley or carrier with the load to a place of delivery, discharging the load at some predetermined point at the place of delivery and returning the trolley or carrier to the starting point is automatically effected by the moving trolley, as it, uninterrupted proceeds along its course from the starting point back to the place of beginning.

In the present application of my mono-rail trolley conveyer system, I shall illustrate and describe a mechanism entirely mechanical throughout, since in the present showing I have presented a conveyer system for docks, warehouses and such other places where cotton and other inflammable commodities are handled and where the utilization of electrically controlled mechanisms is prohibited but I deem it proper to here state that while the mechanism hereinafter explained and illustrated is, for the reason stated, an entirely mechanical outfit, my system need not necessarily be entirely mechanical as it may be constituted of electromechanical means.

Parts for assemblage of all classes of merchandise or manufactured products as well as the raw products for manufacture, are at present carried throughout manufacturing plants by many devices requiring manual attention, such as drayage trucks, hand shoved trolleys and conveyers; and bulk materials of different grades and as many brands are now generally handled by an exhaustless number of mechanical appliances.

Another and important purpose of my invention is to provide in a system of the character outlined, a continuously moving trolley cable with which a large number of trolleys may be readily gripped, each of which has a goods holder suspended therefrom, a mono-rail over which the trolleys are conveyed, a plurality of transverse or station rail sections, each combined with an inlet and an outlet switch mechanism, a means on each trolley that operates to first open and then close the inlet switch mechanism and subsequently close and open the outlet switch mechanism of a selected cross over or transverse station rail.

Again, my invention embodies in a mono-type rail trolley conveyer system, a plurality of cross over rails and switch mechanism for the ingoing and outgoing ends of each cross over, an adjustable selective device on the trolley for engaging the switch controlling mechanism which includes means for releasing the trolley cable grip, whereby to free the trolley from the outgoing cable before the said trolley takes the switch at the ingoing end of a selective cross over or station and for moving the trolley grip back to close against the ingoing portion of the moving cable after the trolley takes the closed outgoing switch for the aforesaid cross over.

Furthermore, my conveyer system embodies an improved and simple adjustable selective device on the trolley for coöperating with a series of relatively fixed selective device trips, each of which designates a predetermined point where the trolleys are to discharge their loads as they cross through or over a selective compartment and adapted for being engaged by the adjustable selective device on the said trolley.

Another and important object in the development of my conveyer mechanism, is the provision of a block system for each cross over or station, also controlled by the moving trolleys, for "blocking" a returning trolley against a possible collision with a trolley that is making a cross over and also the provision of a "safety" stop mechanism which is brought into action under possible contact of one moving trolley with another trolley ahead, whereby the "trailing" trolley is immediately released from grip contact with the conveying table.

With other objects in view and hereinafter fully explained, my present invention is an improved conveyer system that embodies the peculiar features of construction and combination of parts to be first described in detail, specifically pointed out in the appended claims and illustrated in the accompanying drawings, in which:

Figures 1 and 1ᴬ are diagrammatic plan views of warehouses, the heavy lines indicating the outer wall and the cross over the partition walls of the building that divide the warehouse into separate compartments, the light lines indicating the main and cross over trolley rails.

Fig. 2 is a perspective view of the cable guide mechanism over which the endless cables passes as it leaves the power mechanism and to which it returns after having completed its circuit.

Fig. 3 is a perspective view that illustrates a corner construction of the trolley trackway, the location of the release and the trip stops for actuating the trolley to release the cable as it approaches the corner and for causing the trolley to again pick up the cable after passing the corner.

Fig. 4 is a perspective view of the trolley, the same being indicated as passing to a selected cross over or compartment, the cable gripping mechanism being shown as released and lowered from the conveyer trolley and in position for passing with the trolley under the conveyer cable as the trolley takes the ingoing switch.

Figs. 5 and 5ᴬ are respectively a front and rear elevation of one of the trolley mechanisms, the grip devices being shown as in the trolley engaging position.

Fig. 6 is a transverse section of the mechanism shown in Fig. 5, taken on the line 6—6 on Fig. 5.

Figs. 7 and 7ᴬ are views similar to Figs. 5 and 5ᴬ, the toggle grip actuating devices being shown as just tripped by a projection on the rail for shifting the parts to the cable released position.

Fig. 8 is a transverse section on the line 8—8 on Fig. 7.

Fig. 9 is a plan view of one of the ingoing switch mechanisms hereinafter specifically referred to, the parts being positioned for holding the main line switch closed.

Fig. 10 is a similar view of the said switch mechanism, the parts being positioned for holding the ingoing or cross over switch closed in with the main line or outgoing trolley rail.

Fig. 11 is a plan view of one of the switch mechanisms and illustrates the "kick back device" hereinafter referred to, and arranged for being actuated by a passing trolley.

Fig. 12 is a diagrammatic plan view that illustrates the manner in which the cam shoe on the passing trolley engages and shifts the cable sheave out of the path of the grip mechanism when released from the table.

Fig. 13 is a perspective view of a preferred way of mounting the cable sheave.

Fig. 14 is an end elevation of one of the load carriers hereinafter specifically referred to.

Fig. 15 is a detail plan view looking in the direction of the arrow $f$ on Fig. 14.

Fig. 16 is a side elevation of the details shown in Fig. 15.

Figs. 17 and 18 are detail cross sections taken on the lines 17—17 and 18—18 on Fig. 16.

Fig. 19 is a detail horizontal section of the shiftable stop device hereinafter explained, and taken on the line 19—19 on Fig. 16.

Fig. 20 is a diagrammatic plan view that illustrates one trolley as about to pass back onto the main return rail, another or approaching trolley, and the automatically controlled block system for releasing the approaching trolley from the cable for temporarily holding it from movement along the rail.

Figs. 21 and 21ᴬ diagrammatically represent the parts shown in Fig. 20, the approaching trolley being shown as released and as having advanced and operated the "kick back lever devices," the outgoing switch being shown as opened and the main line return switch as closed.

Fig. 22 is a perspective view of one of the "block systems" the parts being shown at the normal position to permit a returning trolley to pass.

Fig. 23 is a diagrammatic plan of the said "block system," the parts being shown in the normal position in full lines and in the trolley cable releasing and car braking position in dotted lines.

Fig. 24 is a detail section that illustrates one of the cable releasing trip stops taken on the line 24—24 on Fig. 23.

Fig. 25 is an elevation of a returning trolley as engaged with a block or brake system, the cable being shown released, the trolley grip resetting and brake releasing lever being shown in this figure.

Fig. 26 is an elevation of the cable grip and the brake releasing lever mechanism and the trolley carriage stops, the grip setting and releasing disk being shown as being rocked to reset the cable grippers, the forward stop being shown as turned up to permit the trolley carriage to pass in the direction of the arrow.

Figs. 27 and 28 are diagrammatic cross sections taken on the lines 27—27 and 28—28 respectively on Fig. 25.

Fig. 28ª is a detail section on the line a—a on Fig. 28.

Fig. 29 is a diagrammatic plan view illustrating the manner in which the cable loop passes into the building to the driving power (not shown).

Fig. 30 is a detail perspective view of the crank lever actuated by a returning trolley for shifting the grip resetting lever shown in Figs. 25 and 26.

Fig. 31 is a detail vertical section on the line 31—31 on Fig. 23 that illustrates the bell crank lever devices actuated by a crossing over trolley for rocking the block system operating shaft.

Fig. 32 is a similar section on the line 32—32 on Fig. 23 that illustrates the bell crank devices that connect with and operate the trolley engaging brake.

Fig. 33 is a face view of the cable gripping mechanism, the parts being in position in full lines for gripping the cable and in dotted lines at the cable released position.

Fig. 34 is a side elevation thereof, the parts being shown in full lines in the cable release position and in dotted lines in the cable gripping position, the guide bracket at that side being omitted.

Fig. 35 is a plan view of the parts shown in Fig. 34.

Fig. 36 is a side elevation of the cable gripping device, parts being in position for gripping the cable.

Fig. 37 is a plan view similar to Fig. 11 and shows the manner in which the "kick back devices" for an outgoing switch mechanism are tripped.

In the drawings, I have illustrated a simple arrangement of my improved conveyer system and, in the showing made, I have indicated a single or monotype rail 1 that extends around the warehouse, it being supported on suitable brackets projected from the warehouse wall and spaced a suitable distance from the outside of the wall, as shown.

Coöperative with the main rail 1 is a number of cross over rails 2, one for each separate bay or room in the warehouse onto which the trolleys pass from the outgoing rail portion $x$ to the return or incoming rail portion $y$, it being understood that in the practical arrangement of the mono-rail, the incoming portion may be at a slightly lower plane than the outgoing rail at the other side, whereby the cross over rails have a sufficient incline that the trolleys, as they leave the main track section to ride upon the cross over rails, pass by gravity from the outgoing rail portion $x$ to the incoming rail portion $y$.

At this point, it should be stated, the first or forward end room 4 of the warehouse may be considered the power or plant compartment, since here is where the endless cable engages with power and transmission mechanism.

Any suitable means may be provided for imparting continuous motion to the endless conveyer cable 3 and for guiding the outgoing and incoming cable sections $x^1$ and $y^1$ from and to the power mechanism. I prefer to use the cable guiding means best shown in Fig. 2, which shows a cable passage $d$ in the front wall of the power compartment from which the outgoing cable section $x^1$ passes onto a pulley $b$, down and under a tightener pulley $c$, then up and over one, $e$, of a pair of guide pulleys $e$ and $f$, the said outgoing section $x^1$ passing along to the loading side of the building while the incoming cable section $y^1$ passes under a pulley $g$, from thence over the overhead pulley $f$ adjacent the pulley $e$ from which it passes through the opening $d$ in the warehouse wall and to the driving mechanism, not shown.

At the approach side of the cable guiding mechanism shown in Fig. 2, the return trolley rail $y$ has a cable release stop $x^{50}$ and, at the outgoing side, the rail $x$ has a cable pick-up stop $x^{60}$ as shown, it being understood that the trolley passes over the gap between the cable portions $x^1$ and $y^1$ by its momentum and is freed from the cable.

That the operation of my improved conveyer system may be more readily understood, it should be mentioned, after placing a load (a round bale for example) on the hanger suspended from and which travels with a trolley or traveling carrier, an operator, by hand operation, sets the cable grip mechanism and thereby starts the trolley along an overhead rail on which the trolley advances and in its travel delivers the load at a predetermined or selected place and, after delivering the said load, continues in its travel and returns to the place from which it started, for reloading.

Referring more particularly to Fig. 4, which illustrates the position of a trolley in the act of conveying a load along the rail section $x$ and as approaching the doorway of the compartment into which the trolley is to pass to deliver the load, and the trolley as about to engage with mechanism that simultaneously effects the release of the grip mechanism from the cable, and lowering the said grip mechanism in a plane below the traveling cable to provide for passing the trolley crosswise under the cable; the said trolley mechanism being also positioned for effecting the setting of the switch mechanism on the incoming side of the compartment across which the trolley is to travel and in which the load is to be delivered at a predetermined place therein, as will hereinafter be more fully explained.

*The trolley mechanism.*—The trolley mechanism, clearly illustrated in Figs. 5, 5ᴬ, 7, 7ᴬ, and 8, includes an upper, a lower and an intermediate horizontal bar or beam, designated 5, 6 and 7 respectively and the said bars are braced by uprights 12—12 riveted at their upper ends to the outside of the uppermost horizontal member 5.

The lower ends of the uprights 12 are bent horizontally inward and form a part of a horizontal yoke frame 13. Near the outer or front ends, the members 12—12 are bolted, as at 12ᵃ—12ᵃ, to the lower horizontal frame bar 6, as is best shown in Figs. 5 and 7, by reference to which and to Fig. 6, it will also be seen the inner end of the said yoke frame 13 forms a bearing for the inner end of a shaft 14 that journals in a bearing bracket 15 on the under face of the bar 6.

8—8 designate a pair of standards that include horizontal foot portions 80—80 rockably secured on the trolley frame bar 6. The upper ends of the standards 8—8 also terminate in horizontal members 81 rockably secured by stud bolts 81ᵃ to an inwardly projected cross bracket 5ᵃ that forms a part of the frame.

Each standard 8 supports a vertically disposed grooved trolley wheel 9 and the said wheels engage the trolley rail sections $x-y$ and the switch rails in their travel from the starting point back to the place of beginning and to facilitate the travel of the said wheels 9 on the curves, the standards 8—8 are rockably mounted, as before stated, and further for properly holding the trolley in operative position, horizontal guide rollers 10—10 are mounted on the outer end of cross members 5ᵃ that engage an upper guide rail 11 which extends around the warehouse in parallelism with the trolley rails $x-y$, as shown.

16 designates what I hereinafter term the cable grip adjusting and locking disk, since the main function of the said disk is to elevate the grip mechanism, presently described in detail, for being clutched with the cable and for releasing the said mechanism from the cable and lowering it in a plane below the said cable.

Disk 16 has a radially extended handle 16ᶜ at the lower edge for setting the gripper jaws into engagement with the cable by hand.

The rear end of the shaft 14, that carries the disk 16 has a guide pulley 17 hereinafter again referred to.

At this point, it should be mentioned that rotary movement of the disk in one direction effects the application of the grip mechanism and the conveying cable and locks such mechanism to its cable grip position and a rotary movement of the said disk in the other direction, effects the release of and the lowering of the said grip mechanism, the said special construction of which I shall now proceed to describe in detail.

*The grip mechanism.*—The grip mechanism, best illustrated in Figs. 6, 8, 33 and 34, includes a frame that consists of a pair of vertically slotted side guides 18—18 bolted at their upper and lower ends to the upper and intermediate horizontal trolley frame members 5 and 7, as is best shown in Figs. 5 and 5ᴬ, from which it will be also seen that each of the guides 18—18 includes a rearwardly extended horizontal bracket 18ᵃ and each of the said brackets carry an adjustable stop screw 18ᶜ, the purpose of which will presently appear.

The cable grip jaws in the construction shown, are mounted on a carriage that reciprocably engages the stationary frame and includes a body portion 19, the opposite side edges 19ᵃ—19ᵃ of which slidably engage the grooves 18ᵇ—18ᵇ in the side guides 18—18 and the said carriage is intermittently reciprocated, through the movement of the reversibly rotated disk 16 hereinbefore referred to, by a link member 20, one end of which has a wrist or crank pin connection with the disk 16, as at 16ᵃ, and the other end thereof connects with a stud 20ᵃ on the front face of the said carriage 19, as shown.

The carriage 19 also includes a top plate 21 that is formed with a transverse slot 21ᵃ and opposite side guides 22, between which the upper or neck ends 23ᵃ—23ᵃ of the opposing cable grip jaws 23—23 are oscillatably mounted.

The cable jaws 23—23 include long shanks, each of which is formed with a transverse hub 23ᵇ through which pass pivot bolts 24—24, each of which has its end journaled in bearings formed in the opposite side members 19ᵃ—19ᵃ of the carriage 19.

The lower end of the jaw shanks are pivotally connected as at 23ᶜ—23ᶜ, to toggle members 25—25 pivotally joined by a cross bolt 26 with a follower or cross head 27, the opposite ends of which terminates in guide flanges 27ᵃ—27ᵃ that ride in guide slots 28—28 formed in the side brackets or members 19ᵃ—19ᵃ of the carriage 19 and which is normally pulled to its uppermost position, to actuate the toggles for holding the cable gripping jaws to their open or cable released position, by a strong coiled spring 29ᵃ that joins with the cross head and the top plate of the carriage, as is best shown in Figs. 6 and 8 of the drawings.

Each guide flange of the follower or cross head 27 has a lateral member 27ᵇ—27ᵇ for coöperating with the adjustable screw stops 18ᶜ—18ᶜ on the vertical side members of the stationary frame, as will presently more fully appear.

By referring particularly to Figs. 5 and 5ᴬ, in which the cable grip is shown as clamping the conveyer cable $x^1$, it will be noticed that the cable is shown as lifted above the normal or cable sheaves engaging position (see broken line) and, at this point, it should be mentioned that the said cable sheaves, as the trolleys pass along the trolley rail, are automatically shifted and held out of the path of the passing cable grip mechanism, and this feature of my invention is illustrated in detail in Figs. 12 and 13, by reference to which it will be seen that the trolley is provided with a cam shoe 30 tapered at both ends, which, as the trolley moves in the direction indicated by the arrow $b$ engages the nearest cable sheave 31, pushes it and swings it back out of the path of the grip devices until the said devices pass and until the rear tapered end of the cam shoe 30 passes the said sheave 31, which latter is then restored to its normal or cable guiding position by a coil spring connection 32.

As before stated, when starting a trolley on its load conveying and delivering journey, it is set or adjusted for selecting the particular cross over compartment of the warehouse or other place of delivery for controlling the ingoing and outgoing switch mechanisms as it passes onto and from the said selected cross over and for selecting, while in transit, the place on the cross over where the load is to be dropped.

For selecting the ingoing switch mechanism, each trolley has a vertical indicator bar 33 on its front face provided with a vertical series of horizontal cross notches or ratchets 34, twelve of such notches being shown for indicating that the system is arranged for working twelve separate compartments or cross overs.

Coöperative with the indicator member 33 is an adjustable cam dog 35 provided with a nose $35^a$ for interlocking with any selected one of the notches 34 and with an apertured heel $35^b$ that slidably engages a vertical tumbler rod or shaft 36 mounted upon the front of the trolley, as shown.

*Switch mechanism.*—At a suitable distance in advance of each transverse compartment or cross over of the warehouse, is mounted an overhanging bracket 37 that includes a horizontal arm $37^a$ secured to the upper or guide rail 11, and a vertical member $37^b$ pendent from the arm $37^a$, back of which the trolley passes. Each bracket 37 carries a tumbler shaft 39 and each of the shafts 39 has a crank arm 38 that carries a roller bearing $38^a$ for being engaged by the cam dog 35 on the passing trolley, when the said dog is set for selecting the said mentioned roller bearing $38^a$, it being understood the bearing $38^a$ for the different cross over points are set in different horizontal planes to register with the different sets of cam dogs 35 mounted on the different passing trolleys.

40 is a shiftable stop, one of which is located at a suitable distance ahead of each cross over or ingoing switch mechanism and each of the said stops is normally held to its drawn back or inoperative position. The stop 40 connects with a crank 41 on the lower end of a rock shaft 42 mounted on the trolley frame and which has a crank 43 at the upper end (see Figs. 9 and 10) which, through a link connection 44 joins with the crank arm $44^a$ on the upper end of the tumbler shaft 39, the several parts mentioned being so arranged that as the roller bearing $38^a$ is engaged by the cam dog 35, as stated, the stop member 40 is projected through the trolley rail in the path of the moving trolley for releasing the cable grip mechanism, which operation is explained as follows:

By referring to Figs. 5, $5^A$, 7 and $7^A$ which show the trolley mechanism in front and rear elevation, it will be observed the trolley disk 16, the adjustments of which, in the manner to be stated, applies and releases the grip mechanism, is positioned for holding the gripper jaws elevated and as gripping the cable, and, when thus positioned, the link 20 is vertically extended and tends to hold the grip devices locked at their uppermost or cable gripping position.

A link member 45 pivotally joins, at one end, with the front face of the disk 16, its other end being pivotally connected with the lower end of a rock lever 46, the upper end of which travels over the outer face of the trolley rail $x$ for engaging with the projected stop 40, it being apparent from Fig. 7 that as the trolley advances in the direction of the arrow, when the lever 46 has engaged the stop 40, it has pushed the link 45 in the direction of the arrow $a$, turns the said disk 16, as indicated, and thereby brings the several parts to the position shown in said Fig. 7, which illustrates the trolley as released from the cable and the cable jaws in a plane below the normal cable line, it being understood that since the entire gripping mechanism is thus lowered to a plane below the conveyer cable, the said trolley mechanism may freely pass under the cable as it takes the ingoing switch to the selected cross over or compartment into which it is to pass, and the said parts remain in the said last mentioned position until the disk 16 is again turned in a reverse direction by reason of a stop roller 47 on the back of the disk coming into contact with a suitably located stop in the path of the moving trolley, as will be hereinafter more fully explained.

*Ingoing switch mechanism.*—A rod 49 at one end connects with the crank $44^a$ on the tumbler shaft 39, and extends forwardly and joins with one end $50^a$ of a bell crank lever 50 fixedly mounted on a vertical rock shaft 51 to which the main line switch rail section $x^2$ is attached so that, as the shaft 51 is rocked in one direction, the switch rail $x^2$ opens, and, when turned in the other direction, under the tension of a spring 52, it brings the switch rail $x^2$ back to the main line closing position.

Connected with that end of the bell crank opposite the end $50^a$ is a toggle device 53 that consists of two links $53^a$—$53^b$ pivotally connected with each other, one member $53^a$ being pivotally connected with the rail $x$ and the other $53^b$ pivotally connected with the bell crank lever end $52^b$, as is best shown in Fig. 10 which shows the main switch section $x^2$ as moved out to the open position and the hinged curved switch member $x^3$ as in the closed position for transferring the trolley from the main line $x$ onto the cross over rail $x$ in the selected compartment.

The manner in which the curved or ingoing switch $x^3$ is shifted to the closed and open position is best explained as follows, reference being especially directed to Figs. 9 and 10 of the drawings in which 54 designates a link rod that joins at one end with the end $52^a$ of the bell crank lever 50 and, at the other end with a crank 55 on the lower end of a rock shaft 56 that carries a toggle link 57 that pivotally joins with another toggle link 58 hinged on the cross over rail $x^4$, as shown.

By reason of the peculiar arrangement of the parts that constitute the ingoing switch mechanism, as shown and described, as the trolley passes along in the direction indicated and, as the tumbler shaft 39 is rocked in the direction indicated and while actuating the cable grip devices to release and lower the trolley from the cable, the bell crank 50, at the ingoing side, is rocked against the tension of its spring 52 in the direction indicated on Fig. 10 and in thus moving the said bell crank 50, the latter, through the link rod 54 adjusts the toggle link members 57 and 58 to form, as it were, a rigid connection between the rock shaft and the outer end of the switch section $x^3$ and thereby bring the said end of the switch $x^3$ in proper alinement with the main line $x$, and it should be stated that the parts are held locked to their adjusted position, by the toggle link connections 58—57 and $53^a$—$53^b$ until the connection $53^a$ and 53 is broken to thereby allow the bell crank lever to be swung back to its other position under the tension of its springs and simultaneously shift the ingoing or curved switch $x^3$ to the open position and the main line switch section $x^2$ to close with the main rail $x$.

59 designates a "kicker lever" pivotally mounted adjacent the toggle members $53^a$—$53^b$ and normally held out of engagement with the said members $53^a$—$53^b$ when they are lengthened to the bell crank lever locking position, as indicated in Fig. 10.

$59^a$ designates a rod that joins with the kicker 59 and extends across the compartment through which the trolley is to pass and connects with a crank $59^b$ on the rock lever $59^c$ provided with a member $59^d$ that is engaged by a lug $59^e$ on the trolley as it passes over to the outgoing switch mechanism and, by reason thereof, rocks the aforesaid lever $59^c$, pulls the rod $59^a$ in the direction indicated and swings the "kicker" 59 into engagement with the toggle $53^a$—$53^b$, breaks the joint and thereby allows the spring 52 to pull the bell crank 50 back to the position shown in Fig. 9 and closes the main line switch $x^1$ with the main line $x$ and opens the ingoing or curved switch $x^3$ from the said main line.

As hereinbefore stated, each trolley includes a load carrier upon which the load, a round bale for example, is placed before starting the trolley on its way and which, in passing through the selected compartment, as the trolley crosses over from the outgoing to the ingoing cable portion, is automatically delivered at any of a selected one of bins or sub-compartments in the main compartment through which the trolley passes.

The load carrier, which is best shown in Figs. 4 and 14 consists of a pair of hanger bars 60—60, the upper ends of which are bolted to the lower bar 6 of the trolley frame and the said hanger bars 60 are braced by cross rods 61 and have their lower ends bent inwardly as at 62, then downwardly as at 63, and then outwardly to form substantially horiontally projected sides or carrier arms 64—64.

65—65 denote rocking lever arms pivotally mounted on a cross bar 66 secured to the side arms 64—64, and the front ends of the said lever arms are bent up at an obtuse angle to the side arms 64 and are braced by a cross rod 67, as shown.

On one of the cross rods 61 of the hanger frame is pivotally mounted a bell crank dog or lever $61^a$ which engages and holds the rocking lever arms 65—65 from tilting on their fulcrum, while conveying the load, as indicated in Fig. 4.

68 denotes a trip rod that connects with the crank lever $61^a$ and with a crank member 69 on a bar or arm $69^a$ which constitutes a part of the trolley mechanism.

Bar $69^a$ is rockably mounted on the trolley frame and it carries an adjustable stop or trip member 71, which, before starting the trolley on its travel to the selected compartment, is set for engaging a fixed stop or abutment 72, one for each bin or sub-space in the said compartment, with which the said member 71 engages as the trolley passes from the incoming to the outgoing side, it being understood that as the stop 71 engages the predetermined member 72, the bar $69^a$ rocks and through the trip rod 68, lifts the crank lever $61^a$ and thereby releases the load holding arm 65—65, see Fig. 14, for dropping the load at the selected place.

*Outgoing switch mechanism.*—In Figs. 20, 21 and 37, which illustrate an outgoing switch mechanism in detail, $x$ indicates the trolley rail, $x^6$ the switch section thereof and $x^7$ the curved switch rail that is hinged to the cross over rail and which, at times, is swung out to a line with the main line $x$ when the switch section $x^6$ is moved to the open position.

A bell crank lever 73 is suitably mounted along the cross over rail and is provided with a roller 73$^a$, which, when the main line switch $x^6$ is closed and the curved or outgoing switch $x^7$ is open, as shown in dotted lines Fig. 37, is engaged by a suitable projection on the passing trolley and is thereby swung in the direction indicated by the arrow $c$. As the bell crank 73 is swung in the direction indicated through a connecting rod 74, it swings a bell crank lever 75—that connects with the main switch rail $x^6$—in the direction of the arrow $d$ and through a link 76 it rocks a crank shaft 77 which by link members 78 and 78$^a$ joins the shaft 77 with the curved switch $x^7$, the connection being such that the main line and the curved or outgoing switch members operate in harmony; as one opens, the other closes and vice-versa.

After the trolley passes from the cross over onto the return portion of the main track, an incoming trolley that follows along the said return trolley section, trips the aforesaid outgoing switch mechanism.

The manner of tripping said outgoing switch mechanism is clearly indicated by Figs. 21 and 37, by reference to which it will be seen a crank arm 79, mounted on a rock shaft 79$^a$ located, at a suitable point in advance of the switch mechanism to be tripped, projects into the path of the trolley cam shoe 30 see dotted lines Figs. 21 and 37, which rocks the shaft 79 and through a crank 79$^b$ on the shaft and a link connection 79$^c$, it actuates a kicker lever 79$^d$ which breaks a toggle connection 75$^a$ and 75$^b$ and coöperative with the bell crank 75 thereby allows the spring $s$ to pull the bell crank 75 back to swing the curved switch rail $x^7$ out of register with the main line and the main line switch $x^6$ into register with the said main line.

*The block system.*—A block system is provided for each transverse compartment or cross over. In Figs. 20 to 24 inclusive is shown one of the block systems in connection with so much of a cross over rail, an outgoing switch mechanism, next, but in advance of the block system, and a trolley traveling on the cross over, as is necessary to illustrate the operation of the said system.

80 designates a bracket that is secured to the overhead guide rail 11 with which connects one end 81$^a$ of a flat spring band brake 81, the free end of which, through a link member 83, joins with one arm 85 of a bell crank lever 86.

Normally the free end of the brake band 81 is pulled back to the position shown in full lines in Fig. 23 to allow for the free passage of the traveling trolley and, at this point, it should be stated, that the means (the bell crank 73) for closing the outgoing switch and the means (presently explained) actuated by the crossing over trolley for adjusting the block system are correlatively so arranged that the block system is first set for cable releasing and arresting an incoming trolley on the return cable, before the outgoing switch is closed, so that the trolley traveling in the return direction is positively held up before the trolley on the cross over reaches the outgoing switch, and the distance space between the switch throwing means and the block or brake system is such, that an incoming trolley, on the return cable, that may have just passed the hold-up or brake devices, will have a clear track rail past the outgoing switch mechanism about to be shifted by the crossing over trolley.

At a suitable distance back of each outgoing switch is located a cable grip release pin 90 and each of the pins 90 rides through an aperture in the trolley rail and pivotally connects with a crank 91 on a horizontal rock shaft 92 journaled in bracket bearings on the back of the trolley rails, as is best shown in Figs. 22 and 23.

96 designates another crank member attached to the rod 92 whose upper end connects through a link 97 with the bell crank lever 86 and 93 is a third crank on the rock shaft 92 with which pivotally connects the lower end of a link rod 93$^a$, the upper end of which joins with a bell crank 98, in turn connected by the cable 99 with a horizontally disposed bell crank 100 located within the building and in such relation to the cross over rail that, the cam shoe of the passing trolley engages it before the bell crank 73 is engaged, it being understood from the drawings that when the bell crank 100 is engaged, as stated, the link rod 93$^a$ is pulled up, see arrow $h$, and thereby rocks the shaft 92, pushes the trip pin 90 through the trolley rail in position for being engaged by the cable releasing or tripping lever 46 and simultaneously shifts the link 97, bell crank 86 and link 83 to move the brake band 81 in position for stopping the trolley, it being understood that the operation of releasing the cable occurs before the cam shoe 30 on the trolley engages the brake band 81, see diagram Fig. 20.

A back stop pawl 101 is attached to a guide member on the trolley rail for holding the trolley from movement in one direction and 102 is a stop arm attached to the rock shaft 92 that stops the trolley from movement in the other direction and the said members 101 and 102 serve to hold the trolley steady during the operation of shifting the gripping mechanism for again gripping the cable after the brake band devices are automatically adjusted for releasing the trolley, as will be now explained.

After a trolley on the return rail, that approaches the selected cross over outgoing switch mechanism (from which a crossing trolley is about to pass) has been blocked as before mentioned, as the cross over trolley passes the outgoing switch and takes the main or return rail, a stop 88 (see Fig. 21^A) suitably mounted on the said return line, engages the stop roller 47 on the disk 16 and rotates the said disk in a direction (see arrow $m$ on Fig. 26) to cause the cable jaws to rise up and to close and grip the cable.

As the cross over trolley passes back onto the return line, as stated, it engages a bell crank lever 105 that is suitably located along the main line, and which, through a cable connection 105^a, joins with a lever 106 fulcrumed on a bracket 107 pendent from the top or guide rail 11. The lower end of the lever 106, through a link member 106^a pivotally connects with a shiftable member 108 that is slidably mounted on a slotted guide way 109 on the trolley rail and provided with a tripping lug 109^a adapted for being moved into engagement with the stop roller 47 (see Fig. 26) that projects from the rear face of the disk 16, for turning the disk in the direction of the said arrow $m$ and thereby restore the gripping jaws to the cable gripping position. The same pull on the lever 106 that operates to turn the disk 16 turns the shaft 92 back for withdrawing the pin 90 and for shifting the connections 96, 97, 86 and 83 to free the brake band from a braking or trolley arresting position.

To provide for turning the shaft 92 through the swing of the lever 106, as stated, the said lever has a cam heel 106^b that engages a crank-like cam member 111 on the rock shaft 92 and in such a manner that when the said lever 106 is pulled in the direction indicated, the cam heel 106^a engages the cam-like member 111 on the shaft 92 and thereby causes the shaft to return in a reverse direction and through the shifting of the members 96, 97, 86 and 83 pull the brake 81 back out of the path of the cam shoe 30 on the trolley and at the same time pull the release pin 90 back and out of operative position. A spring 112 restores the lever 106 to its normal position when tension on its pulling cable 105^a is released.

At each corner of the building around which the cable and the trolley rail pass, a release stop 114 and a pick-up stop 115 are suitably located, the stop 114 being positioned for engaging the trip lever 46 on the trolley for releasing the cable and the stop 115 for being engaged by the stud roller 47 on the back of the disk 16 which turns the said disk for restoring the cable grip.

A safety device comes into play in the event of a pair of trolleys running into or colliding and, for such purpose, each trolley has a forwardly projecting rod 116 that connects with a wrist pin 117 on the disk 16 in such manner that impact on the front end of the rod with another trolley will rotate the disk 16 and thereby pull the cable gripping mechanism down with the jaws opened from contact with the cable.

From the foregoing description taken in connection with the accompanying drawings, the complete construction, the manner of operation and the general advantages of my conveyer system will be readily understood by those skilled in the art to which this invention relates.

While I have specifically shown my system as adapted for conveying and delivering commodities to warehouse compartments, it is obvious that without departing from the generic features of my invention or materially modifying the details of structure outlined, the said system may be readily arranged for the distribution of cotton bales and miscellaneous freights to and from cars and compress, to and from ship side, wharves, terminals, over tracks, buildings and streets, or in other words, the system shown can be modified to carry also any commodity of general commercial use under conditions heretofore impossible on account of the flexibility now to be obtained with my system.

What I claim is:

1. In a trolley system, a main trackway, branch trackways from said main trackway, ingoing switches between the main and branch ways, outgoing switches between said branch and main ways, carriages running on said ways, a power cable to move said carriages, switch moving devices, selective means on the carriage for actuating predetermined ingoing switch moving devices to open the switch, means engaged by the carriage on entering the branch way to close the main way switch, means operated by an outgoing carriage on a branch way for opening the respective outgoing switch and effecting a stoppage of an approaching carriage on the main way until the outgoing carriage has passed onto the main way.

2. In a trolley system, a main trackway, branch trackways for said main trackway, ingoing switches between the main and branch ways, outgoing switches between said branch and main ways, carriages running on said ways, a power cable to move said carriages, switch moving devices, selective means on the carriage for actuating predetermined ingoing switch moving devices to open the switch, means engaged by the carriage on entering the branch way to close the main way switch, means operated by an outgoing carriage on a branch way for opening the respective outgoing switch and effecting a stoppage of a branch carriage on the main way until the outgoing carriage has passed onto the main way, and further means governed by said outgoing carriage on arriving on the main way for restarting the previously stopped carriage and means for closing the main line switch.

3. In a trolley system of the character described, in combination with the main overhead single rail trackway and an overhead single rail branch trackway, of a switch for opening the main way and connecting it with the branch way, the said switch including movable main and branch way sections, means for moving the said sections from one position to the other and including devices governed by the approaching carriage for opening the main way and closing the branch way switch, whereby the carriage suspension mechanism can pass through between the two movable switch rail sections.

4. In combination with the main trackway and a branch way, of a switch for opening the main way and connecting it with the branch way, said switch including movable main and branch sections, means for moving the said sections from one position to the other and including devices governed by the approaching carriage for opening the main way and closing the branch way switch, means to lock the switch open, other means (governed by the carriage upon entering the branch way) for adjusting the locking means to unlock the switch and means to then throw the switch to close the main line and open the branch line.

5. In combination with the main trackway and a branch way, of a switch for opening the main way and connecting it with the branch way, said switch including movable main and branch sections, means for moving the said sections from one position to the other and including devices governed by the approaching carriage for opening the main way and closing the branch way switch, a toggle link device to hold the switch open and means (governed by the carriage upon entering the branch way) for braking the toggle to unlock the switch and means for then throwing the switch to close the main line and open the branch way.

6. In a trolley system, a main trackway and branch trackways, ingoing switch mechanism between the main way and the branch way, outgoing switches between the branch and the main ways, a draft cable along the main way, carriages traveling on the ways and having cable grips, means governed by an approaching carriage for throwing the switch from the main to the branch way, means for releasing the cable grip to permit the carriage to travel under momentum onto the branch way and reclose the main line switch.

7. In a trolley system, a main trackway and branch trackways, ingoing switch mechanism between the main way and the branch way, outgoing switches between the branch and the main ways, a draft cable along the main way, carriages traveling on the ways and having cable grips, selective means governed by an approaching carriage for throwing the switch from the main to the branch way, means for releasing the cable grip to permit the carriage to travel under momentum onto the branch way and reclose the main line switch.

8. In a trolley system, a main trackway and branch trackways, ingoing switch mechanism between the main way and the branch way, outgoing switches between the branch and the main ways, a draft cable along the main way, carriages traveling on the ways and having cable grips, means governed by an outgoing carriage on the branch way for opening the main line switch and closing the branch line with the main line, means governed by the outgoing carriage for releasing the cable grip of an approaching carriage on the main line, means for stopping and holding said approaching carriage before it reaches the open switch, means on the track for engaging the cable grip of the outgoing carriage when on the main line, means governed by the outgoing carriage for releasing the stopped carriage on the main line and actuating its cable grip to move it to the gripping position again, and means governed by said last named carriage for closing the main line switch.

9. In a trolley system, an endless main trackway, an endless draft cable above and in parallelism with the trackway, a plurality of transverse trackways that cross over from the outgoing to the ingoing portions of the main trackway, an ingoing and an outgoing switch mechanism for joining the ingoing and outgoing ends of the cross over with the main trackway, a plurality of carriages that travel on the trackways, a cable grip mechanism on each carriage, shifting means for each switch mechanism, selective devices on the carriages that operate the said switch mechanism for closing the main trackway with predetermined ones of the cross over trackways for directing the travel of the carriages from the main trackway onto the cross over and back onto the said main trackway, means in advance of each cross over on the outgoing portion of the main trackway for actuating the grip mechanism for releasing the cable and dropping the grip mechanism below the draft cable, whereby to allow the carriage to pass under the cable as it goes onto a cross over and a means on the return portion of the main trackway for each cross over for engaging and restoring the grip mechanism in a grip engagement with the trolley.

10. In a trolley system, an endless main trackway, an endless draft cable above and in parallelism with the track way, a plurality of transverse trackways that cross over from the outgoing to the ingoing portions of the main trackway, an ingoing and an outgoing switch mechanism for joining the ingoing and outgoing ends of the cross over with the main trackway, a plurality of carriages that travel on the trackways, a cable grip mechanism on each carriage, shifting means for each switch mechanism, selective devices on the carriages that operate the said switch mechanism for closing the main trackway with predetermined ones of the cross over trackways for directing the travel of the carriage from the main trackway onto the cross over and back onto the said main trackway, means in advance of each cross over on the outgoing portion of the main trackway for actuating the grip mechanism for releasing the cable and dropping the grip mechanism below the draft cable, whereby to allow the carriage to pass under the cable as it goes onto a cross over and a means on the return portion of the main trackway for each cross over for engaging and restoring the grip mechanism in a grip engagement with the trolley, said carriages each including a pendently supported load hanger and means along each cross over for engaging and discharging the load hanger as the carriage travels over the cross over.

11. In a trolley system, an endless main trackway, an endless draft cable above and in parallelism with the trackway, a plurality of transverse trackways that cross over from the outgoing to the ingoing portions of the main trackway, an ingoing and an outgoing switch mechanism for joining the ingoing and outgoing ends of the cross over with the main trackway, a plurality of carriages that travel on the trackways, a cable grip mechanism on each carriage, shifting means for each switch mechanism, selective devices on the carriages that operate the said switch mechanism for closing the main trackway with predetermined ones of the cross over trackways for directing the travel of the carriage from the main trackway onto the cross over and back onto the said main trackway, means in advance of each cross over on the outgoing portion of the main trackway for actuating the grip mechanism for releasing the cable and dropping the grip mechanism below the draft cable, whereby to allow the carriage to pass under the cable as it goes onto a cross over and a means on the return portion of the main trackway for each cross over for engaging and restoring the grip mechanism in a grip engagement with the trolley, said carriages each including a pendently supported load hanger and means along each cross over for engaging and discharging the load hanger as the carriage travels over the cross over, the said means including selective devices for effecting the load discharge at predetermined points as the carriage travels along the cross over.

12. In a trolley system, a main trackway, a branch trackway, a switch mechanism connecting the main and branch trackways, a live overhead cable in parallelism with the main trackway, a trolley movable along the trackways, a cable grip mechanism on the trolley and coöperative means on the trolley and the trackway for shifting the switch mechanism to connect the main and branch trackways and for releasing the grip mechanism from the cable as the trolley passes from the main trackway onto the branch trackway.

13. A trolley system comprising an endless main track rail, a plurality of branch track rails that cross over from the outgoing to the ingoing portions of the main track rails, an ingoing and an outgoing switch mechanism coöperative with each cross over rail and the main rail sections, a live overhead cable paralleling the main trackway, a trolley carriage traveling along the track rails, a cable grip mechanism movable with the carriage and coöperative means along the outgoing portion of the main trackway and the trolley carriage, operable by the moving carriage, for releasing the grip mechanism from the cable and opening an approaching ingoing switch to pass the carriage from the main track onto a cross over, means operated by the crossing over carriage for closing the ingoing switch and for opening and closing the outgoing switch to pass the carriage onto the return portion of the main track and other means along the return portion of the track operable by the returning carriage for restoring the cable grip mechanism into engagement with the cable.

14. A trolley system comprising an endless main track rail, a plurality of branch track rails that cross over from the outgoing to the ingoing portion of the main track rail, an ingoing and an outgoing switch mechanism coöperative with the cross over rail and the main rail sections, a live overhead cable paralleling the main trackway, a trolley carriage including a pendent load holding and discharging means traveling along the track rails, a cable grip mechanism movable with the carriage and coöperative means along the outgoing portion of the main trackway and on the trolley carriage and operable by the moving carriage, for releasing the grip mechanism from the cable and opening an ingoing switch to pass the carriage from the main track rail onto a cross over rail, means operated by the crossing over carriage for closing the ingoing switch and opening and closing the outgoing switch to pass the carriage from the cross over track rail onto the return portion of the main track rail and tripping mechanisms along the cross over track over which the carriage passes actuated by a moving carriage for tripping the load holder to discharge the load as the carriage travels along the cross over.

15. In a trolley system, a main track line and branch lines, ingoing and outgoing switch mechanisms for shunting the carriage from the main line onto the branch lines and vice versa, said outgoing switch mechanism comprising main and branch switch sections and mechanism whereby the same may be moved, a power cable to move the carriage along the main line, cable grips on the carriages, a device along the main line adjacent to the outgoing switch to release the cable grip of a carriage approaching on the main line, means governed by the outgoing carriage on the branch line for setting said releasing device to stop the approaching carriage, means governed by the outgoing carriage for opening the switch to connect the branch to the main line and means governed by the outgoing carriage for resetting the main line and again starting the carriage stopped on the main line, and means for closing the main line switch before the incoming carriage reaches the same.

16. In a trolley system of the character stated, an endless main track rail, a plurality of cross over rails, ingoing and outgoing switch mechanisms coöperative with each cross over rail and the main track rail, a trolley carriage adapted for traveling along the track rails, a live cable paralleling the main track rail, a grip mechanism mounted on the carriage, a throwing means for the ingoing switch mechanism, a cable grip mechanism controlling device arranged for being actuated by the movement of the outgoing trolley carriage, whereby to release the grip mechanism from the cable and actuate the said switch throwing mechanism to shift the ingoing switch for bringing the cross over rail in line with the main rail to pass the carriage onto the cross over and reshifting the said switch mechanism to close the main line track, a switch throwing mechanism for each outgoing switch operable by the moving trolley for opening and closing the outgoing switch, and means actuated by the moving carriage after it has passed from the cross over track onto the return portion of the main track for shifting the cable mechanism into a cable gripping position.

17. In a trolley system of the character stated, an endless main track rail, a plurality of cross over rails, ingoing and outgoing switch mechanisms coöperative with each cross over rail and the main track rail, a trolley carriage adapted for traveling along the track rails, a live cable paralleling the main track rail, a grip mechanism mounted on the carriage, a throwing means for the ingoing switch mechanism, a cable grip mechanism controlling device arranged for being actuated by the movement of the outgoing trolley carriage, whereby to release the grip mechanism from the cable and actuate the said switch throwing mechanism to shift the ingoing switch for bringing the cross over rail in line with the main rail to pass the carriage onto the cross over and reshifting the said switch mechanism to close the main line track, a switch throwing mechanism for each outgoing switch operable by the moving trolley for opening and closing the outgoing switch, means actuated by the moving carriage after it has passed from the cross over track on to the return portion of the main track for shifting the cable mechanism into a cable gripping position, and means controlled by a trolley carriage and located in advance of the outgoing switch to which the crossing over carriage is advancing for blocking another carriage traveling toward the outgoing switch to which the cross over carriage is passing, whereby to avoid collision of two carriages at the outgoing switch.

18. In an overhead trolley system, in which is included a single track main and single lateral trolley rails, a switch mechanism coöperative with each main and lateral rail and a tripper for each switch mechanism, a trolley adapted to travel along the main and lateral rails, and an adjustable member on the trolley adapted to be set to engage a selected switch tripper as the trolley moves along the track rails.

19. In a trolley system in which is included switches at predetermined places along the line for directing the course of the moving trolley and means for temporarily stopping the movement of a trolley, a trolley provided with an indicator device adapted to engage and throw selective ones of the switches and to engage and set the means for stopping a trolley to arrest the movement of a trolley approaching the trolley having the indicator device and for releasing the said approaching trolley after the said trolley with the indicator device reaches a point of travel in advance of the said approaching trolley.

20. In a trolley system of the character stated and which includes an overhanging trolley rail having one or more curved sections, a trolley, a load carrier suspended therefrom and means for compensating the centrifugal action of the load as the trolley takes the rail curves to hold the trolley erect and to permit the said centrifugal action of the load carrier in proportion with the curve, to retain the load on the carrier.

21. In a load conveying system of the character stated and which includes an endless main trackway, a plurality of branch trackways, outgoing and ingoing switch mechanisms for connecting the branch trackways with the outgoing and incoming portions of the main trackway and a live overhead cable paralleling the main trackway, a plurality of trolleys each including a pendent load holder and swivel track engaging sheaves, a cable grip mechanism mounted on each trolley, coöperative means on the trolley and on the trackway adapted at predetermined times for interengaging whereby to shift the trolley mechanism into and out of the cable gripping position, a block system for each branch track located on the ingoing portion of the main trackway and including a cable grip mechanism tripper device, means on each branch trackway operable by a crossing over trolley for adjusting its respective block system whereby to adapt it to arrest the passage of an incoming trolley toward the said branch track, and other means on the incoming track portion operated by the trolley that passes over the cross over onto the return track for adjusting the aforesaid block system to release the said arrested trolley and to restore the cable gripping mechanism into engagement with the power cable.

22. In a load conveying system in which is included a main trolley rail and a branch trolley rail, an overhead live cable in parallelism with the main trolley rail, cable grip mechanism and a means on the trolley for shifting the cable grip mechanism to grip the cable, a switch mechanism comprising main and branch line switch sections, means tending to normally hold the main line switch section closed and the branch line section open and means controlled by an advancing trolley for first tripping the grip mechanism on the trolley to release the trolley from the cable and for shifting the main line switch section to the open and the branch line switch section to the closed position, whereby to direct the moving trolley from the main to the branch line track rail.

23. In a load conveying system in which is included a main trolley rail and a branch trolley rail, an overhead live cable in parallelism with the main trolley rail, cable grip mechanism and a means on the trolley for shifting the cable grip mechanism to grip the cable, a switch mechanism comprising main and branch line switch sections, means tending to normally hold the main line switch section closed and the branch line section open, means controlled by an advancing trolley for first tripping the grip mechanism on the trolley to release the trolley from the cable and for shifting the main line switch section to the open and the branch line switch section to the closed position, whereby to direct the moving trolley from the main to the branch line track rail, other means for holding the said switch sections at the last stated position and a device operated by the trolley as it passes along the branch line for tripping the said locking means, whereby to permit the switch sections to turn to their normal position.

24. In a load conveying system in which is included a main and a branch trolley trackway, an overhead live cable in parallelism with the main track, a trolley mounted on the track, cable grip mechanism on the trolley and a switch mechanism for transferring the trolley from the main to the branch trackway, the said mechanism including a main line switch section, a bell crank lever fixedly connected thereto and which forms the hinge for the said main line section, a spring tending to normally rock the said bell crank lever to swing the said main line section closed with the main track, a branch line switch section hinged to the branch line track, a bell crank and link connection attached to the front end of the said branch switch, a link connecting the main switch and the branch switch bell crank levers to provide for moving the said levers together, the bell crank and link lever for the branch section forming a pusher for forcing the branch section to close in with the main track, a toggle lever lock connecting the main switch bell crank and a fixed part adapted to hold the said lever locked when the main line is open and the branch line is closed, a tripper pin in advance of the switch mechanism and adapted to be projected in the path of the moving trolley for engaging with and shifting the cable grip mechanism to release the trolley from the cable, and means connecting with the said tripper pin and the main bell crank lever operable by the passing trolley for setting the grip releasing pin and the switch mechanism, whereby to first release the cable and then provide for passing the trolley onto the branch line and a kicker device operated by the trolley as it crosses over the branch line for releasing the toggle lever lock connection whereby to permit the switch mechanism and the tripper pin to return to their normal position.

25. In a load conveyer, an outgoing main track, an ingoing main track, branch tracks that extend from the outgoing to the incoming tracks, live overhead cables in parallelism with the outgoing and incoming tracks, an ingoing and outgoing switch mechanism for connecting each branch track with the outgoing and incoming main tracks, a trolley, a grip mechanism carried by the trolley adapted for being automatically shifted into and out of grip contact with the overhead cables, a tripper device in advance of each ingoing switch mechanism and a like tripper device beyond each outgoing switch mechanism, a switch throwing means for each switch, said tripper devices and the switch throwing means being arranged for being operated by a passing trolley to first release the cable, then open the ingoing switch mechanism to close the main track with the branch or cross over and then shift the said switch back to normal, then open and close the outgoing switch mechanism to pass the trolley onto the ingoing main track and then trip the grip mechanism on the trolley to again engage the cable.

26. In a load conveyer, an outgoing main track, an ingoing main track, branch tracks that extend from the outgoing to the incoming tracks, live overhead cables in parallelism with the outgoing and incoming tracks, an ingoing and outgoing switch mechanism for connecting each branch track with the outgoing and incoming main tracks, a plurality of trolleys, a grip mechanism carried by each trolley adapted for being automatically shifted into and out of grip contact with the overhead cables, a tripper device in advance of each ingoing switch mechanism and a like tripper device beyond each outgoing switch mechanism, a switch throwing means for each switch, said tripper devices and the switch throwing means being arranged for being operated by a passing trolley to first release the cable then open the ingoing switch mechanism to close the main track with the branch or cross over, and then shift the said switch back to normal, then open and close the outgoing switch mechanism to pass the trolley onto the ingoing main track and then trip the grip mechanism on the trolley to again engage the cable, and a block system in advance of each outgoing switch adapted for being set by a crossing over trolley for stopping another trolley advancing along the incoming main track toward the outgoing switch for the branch line over which a trolley may be passing.

27. In a load conveyer system of the character described, a main line trolley rail, a plurality of lateral trolley rails, a plurality of load carrying trolleys, an overhead live cable in parallelism with the main line trolley rail, a separate switch mechanism for opening the main line and connecting the said line with each of the lateral trolley rails, a cable grip mechanism carried on each trolley, said mechanism being manually and automatically shiftable to its cable gripping and releasing positions, a trip device on the main trolley line in advance of each switch mechanism, a means connected with each switch device and adjacent trip device, the said means for each coöperating switch mechanism and trip device being arbitrarily positioned with respect to the like means for the other coöperating switch mechanisms and trippers, and an adjustable cam device on the trolley adapted to be set for selecting a predetermined one of the switch mechanism and tripper devices whereby as the trolley travels along the main trackway it will actuate a selected one of the tripper devices for adjusting it in position for tripping and releasing the cable gripping mechanism and for simultaneously shifting the adjacent switch to connect the main line with the selected branch line to pass the moving load carrying trolley from the main onto the branch line.

28. In a load conveyer system of the character described, a main line trolley rail, a plurality of lateral trolley rails, a plurality of load carrying trolleys, an overhead live cable in parallelism with the main line trolley rail, a separate switch mechanism for opening the main line and connecting the said line with each of the lateral trolley rails, a cable grip mechanism carried on each trolley, said mechanism being manually and automatically shiftable to its cable gripping and releasing positions, a trip device on the main trolley line in advance of each switch mechanism, a means connected with each switch device and adjacent trip device, the said means for each coöperating switch mechanism and trip device being arbitrarily positioned with respect to the like means for the other coöperating switch mechanism and trippers and an adjustable cam device on the trolley adapted to be set for selecting a predetermined one of the switch mechanism and tripper devices whereby as the trolley travels along the main trackway it will actuate a selected one of the tripper devices for adjusting it in position for tripping and releasing the cable gripping mechanism and for simultaneously shifting the adjacent switch to connect the main line with the selected branch line to pass the moving load carrying trolley from the main onto the branch line, and a selective coöperating means on the branch line and the trolley for effecting the discharge of the load at a predetermined point along the branch line, said selective means being actuated by the trolley as it passes along the said branch line.

29. In a load conveying system of the character stated, a main and a return trolley rail, a plurality of cross over rails, an ingoing and an outgoing switch mechanism for connecting each cross over rail with the outgoing and incoming trolley rails, at least one trolley, a load carrier attached thereto, the said carrier including a load discharger, mechanism controlled by the moving trolley for opening and closing the ingoing and the outgoing switch mechanism, the said mechanism including selective devices for causing the trolley to pass onto a predetermined one of the cross over rails and means along the cross over rail and devices on the trolley coöperative with the said means for adjusting the load discharger to drop the load at a predetermined point along the cross over.

30. A load conveying system in which is included an outgoing and return main trolley rail, a live overhead cable in parallelism with the main trolley rail, and a plurality of cross over rails, an ingoing and outgoing switch mechanism for each cross over rail adapted to be set to the open and closed position by a passing trolley, a plurality of trolleys, a grip mechanism on each trolley, said mechanism being adapted for being manually and automatically shifted to engage and disengage the cable, selective mechanism controlled by the outgoing trolleys for operating the ingoing switches of predetermined ones of the cross overs, a block system for each outgoing switch side of the cross over rails, said system including yieldable brake devices adapted to be engaged by an advancing trolley, means operable by the passing cross over trolley for adjusting the brake devices to a trolley gripping position, means controlled by the advancing trolley for releasing the grip mechanism thereon from the cable, other means operable by the crossing over trolley for releasing the held up trolley and for shifting the grip mechanism on the said held up trolley for reëngaging the cable.

31. In a load conveying system in which is included a main trolley rail, an overhead live cable in parallelism with the main trolley rail, a lateral or branch rail having a switch connection with the main rail adapted when closed to direct a trolley from the branch rail onto the main rail, a plurality of load carrying trolleys, each having a cam shoe, a cable gripping mechanism mounted on each trolley, means controlled by a moving trolley for shifting the gripping mechanism on another trolley into and out of a cable engaging position at predetermined times; a block system in advance of the branch rail, said system including a brake band, means operable by a trolley traveling on the branch rail toward the main rail for moving the brake band in the path of the cam shoe of a trolley advancing on the main rail, means also set by the trolley on the branch line for effecting the tripping of the grip mechanism on the trolley that is advancing to engage with the brake band, further means operating after the trolley on the branch rail passes onto the main rail for shifting the spring brake to release the held up trolley, devices for temporarily holding the trolley release from the brake while shifting its grip mechanism to engage with the cable and devices actuated by the trolley that has passed from the branch rail onto the main rail for effecting the application of the grip mechanism on the brake held up trolley and simultaneously shifting the means for temporarily holding up the said brake held up trolley whereby to permit the said trolley to advance with the cable.

32. In an overhead trolley system comprising an endless main trolley rail, a series of cross over rails, ingoing and outgoing switch connections controlled by the moving trolleys that join the cross over rails with the outgoing and ingoing portions of the endless trolley rail, a live overhead cable in parallelism with the main trolley rail, a plurality of load carrying trolleys, a cable gripping mechanism carried on each trolley manually and automatically shiftable to the cable engaging and disengaging positions, devices on the outgoing portion of the track rail for effecting movement of the cable grip mechanism on the trolleys whereby to release the trolley from the cable, devices on the ingoing portion of the track rail for effecting movement of the grip mechanisms on the trolleys whereby to grip the cable, said grip actuating devices being operated by a passing trolley and means on the ingoing portion of the main track actuated by a trolley on a cross over track for engaging and temporarily holding a trolley approaching within a predetermined distance with respect to the cross over track over which a trolley may be passing, whereby to avoid collision between the two trolleys, and devices actuated by the trolley after crossing over and returning to the main track for shifting the trolley hold up means and restoring the grip mechanism on the said released trolley into a grip engagement with the cable.

33. In a continuous rail trolley system which includes a plurality of cross over rails and switch mechanisms controlled by the passing trolleys that join the cross over rails with the outgoing and return portions of the continuous rail, a live cable in parallelism with the continuous trolley rail, a plurality of trolleys, a cable grip mechanism on each trolley, means coöperative with the continuous rail and the trolleys for shifting the grip mechanism into and out of cable gripping condition at times, and means on one trolley adapted for tripping its cable gripping mechanism whereby to release the cable when the said trolley collides with another trolley.

EDWARD HANAK.